United States Patent
Takahashi et al.

(10) Patent No.: US 10,843,354 B2
(45) Date of Patent: Nov. 24, 2020

(54) ACTUATOR AND ELECTRIC BEAUTY DEVICE

(71) Applicants: Yuki Takahashi, Tokyo (JP); Masami Kamijo, Tokyo (JP); Kazutaka Sakaguchi, Tokyo (JP); Yasutaka Kitamura, Tokyo (JP); Masaharu Kagami, Tokyo (JP); Shigenori Inamoto, Tokyo (JP)

(72) Inventors: Yuki Takahashi, Tokyo (JP); Masami Kamijo, Tokyo (JP); Kazutaka Sakaguchi, Tokyo (JP); Yasutaka Kitamura, Tokyo (JP); Masaharu Kagami, Tokyo (JP); Shigenori Inamoto, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 176 days.

(21) Appl. No.: 15/749,898

(22) PCT Filed: Aug. 2, 2016

(86) PCT No.: PCT/JP2016/003561
§ 371 (c)(1),
(2) Date: Feb. 2, 2018

(87) PCT Pub. No.: WO2017/022242
PCT Pub. Date: Feb. 9, 2017

(65) Prior Publication Data
US 2018/0215055 A1 Aug. 2, 2018

(30) Foreign Application Priority Data
Aug. 4, 2015 (JP) ................... 2015-154522

(51) Int. Cl.
*B26B 19/28* (2006.01)
*H02K 33/16* (2006.01)
(Continued)

(52) U.S. Cl.
CPC .......... *B26B 19/28* (2013.01); *A61C 17/3418* (2013.01); *B06B 1/04* (2013.01);
(Continued)

(58) Field of Classification Search
CPC ...... H02K 1/145; H02K 21/22; H02K 21/227; H02K 33/02; H02K 33/16; B26B 19/282;
(Continued)

(56) References Cited

U.S. PATENT DOCUMENTS 2,740,624 A * 4/1956 Cottrell .................. B60G 11/15
267/275
2,751,857 A * 6/1956 Heater .................... B61F 5/122
105/198.6
(Continued)

FOREIGN PATENT DOCUMENTS

JP 2000-500370 A 1/2000
JP 3427468 B2 7/2003
(Continued)

OTHER PUBLICATIONS

International Search Report from International Application No. PCT/JP2016/003561 dated Oct. 25, 2016.
(Continued)

*Primary Examiner* — Tulsidas C Patel
*Assistant Examiner* — Ahmed Elnakib
(74) *Attorney, Agent, or Firm* — Brundidge & Stanger, P.C.

(57) ABSTRACT

Provided is an actuator that has a simple configuration and can stably achieve high output. This actuator has: a movable body provided with a cylindrical magnet section alternately
(Continued)

having N-pole faces and S-pole faces on a peripheral surface thereof along the circumferential direction; a fixed body provided with pole tooth surfaces disposed facing the peripheral surface a magnet section and a coil that excites the pole tooth sections; and a spring material holds the movable body to the fixed body in a freely movable manner. The spring material is fixed to at least one of the movable body and the fixed body via a joint section. The joint section has a fixing part for fixing and end section of the spring material, and a stress relaxation part that is disposed in proximity to the fixing part and relaxes stress generated during deformation of the spring material.

6 Claims, 20 Drawing Sheets

(51) Int. Cl.
  *B06B 1/04* (2006.01)
  *A61C 17/34* (2006.01)
  *H02K 21/22* (2006.01)
  *F16F 15/121* (2006.01)
(52) U.S. Cl.
  CPC .......... *H02K 21/227* (2013.01); *H02K 33/16* (2013.01); *A61C 17/34* (2013.01); *F16F 15/1216* (2013.01)
(58) Field of Classification Search
  CPC ........... B26B 19/28; B06B 1/04; A61C 17/34; A61C 17/3418; F16C 33/104; F16C 33/128; F16C 2202/42; F16C 2204/60; F16F 15/12; F16F 15/1216; F16F 1/22; F16F 1/127

USPC .................................. 310/15, 47, 38, 50, 97
  See application file for complete search history.

(56) References Cited

U.S. PATENT DOCUMENTS

| | | | | |
|---|---|---|---|---|
| 2,769,946 | A * | 11/1956 | Brailsford | H02K 33/14 318/128 |
| 5,383,076 | A * | 1/1995 | Saito | G11B 5/41 360/128 |
| 5,613,259 | A * | 3/1997 | Craft | A61C 17/3481 15/22.1 |
| 6,151,780 | A | 11/2000 | Klein | |
| 7,732,952 | B1 | 6/2010 | Taylor | |
| 2007/0254756 | A1 | 11/2007 | Kawamoto et al. | |
| 2009/0243405 | A1 | 10/2009 | Luo | |
| 2014/0117788 | A1* | 5/2014 | Takahashi | H02K 33/16 310/38 |
| 2015/0362047 | A1* | 12/2015 | Barillet | F16H 7/1281 474/135 |
| 2018/0234000 | A1* | 8/2018 | Takahashi | H02K 21/145 |

FOREIGN PATENT DOCUMENTS

| | | |
|---|---|---|
| JP | 2004-343932 A | 12/2004 |
| JP | 2007-113634 A | 5/2007 |
| JP | 2014-093833 A | 5/2014 |

OTHER PUBLICATIONS

Extended European Search Report issued in EP 16832523.1 dated Mar. 8, 2019, 10 pages.

* cited by examiner

ACTUATOR AND ELECTRIC BEAUTY DEVICE

TECHNICAL FIELD

The present invention relates to a resonant turning-type actuator and an electric beauty device.

BACKGROUND ART

Conventionally, as an example of a general drive source for an electric beauty device such as an electric razor, an electric hair chipper, an electric toothbrush or an electric face-wash brush, a configuration in which a movable body is driven by a DC motor such as indicated in Patent Literature 1 has been known. Also, as indicated in Patent Literature 2, a linear resonant-type actuator in which a plurality of movable elements for movable blades are reciprocated by a single fixed element has been known.

CITATION LIST

Patent Literature

PTL 1

Japanese Unexamined Patent Application Publication (Translation of PCT Application) No. 2000-500370

PTL 2

Japanese Patent No. 3427468

SUMMARY OF INVENTION

Technical Problem

For an actuator to be used for an electric beauty device such as an electric razor and brought into rotational reciprocating motion, an actuator that stably provides a high power with a simpler configuration is desirable. For example, where a DC motor is used, the rotation frequency of the motor is lowered by load at the time of the motor being driven, and the rotation speed of the motor is thus lowered, which may cause fluctuation in rotation speed. The rotation fluctuation may give a feeling of discomfort to the user. Also, in a configuration in which a movable body is movably supported by an elastic member such as a spring, where, e.g., a torsion coil spring is used as the elastic member, since the elastic member has a certain manufacturing tolerance (variation) in manufacturing, it is difficult to maintain precision, and in order to maintain high power, a structure that easily ensures assembling precision is desired.

An object of the present invention is to provide an actuator and an electric beauty device that enable provision of a stable high power with a simple configuration.

Solution to Problem

An aspect of an actuator of the present invention includes: a movable body including a cylindrical magnet section including N-pole faces and S-pole faces circumferentially alternately on a circumferential surface; a fixed body including a number of pole teeth surfaces arranged circumferentially so as to face the circumferential surface of the magnet section, the number of pole teeth surfaces being equal to a number of the N-pole faces and the S-pole faces, and a coil that upon supply of a current, excites the pole teeth surfaces so that the pole teeth surfaces have circumferentially alternately different polarities; and a spring material connected to the movable body and the fixed body, the spring material causing the fixed body to movably hold the movable body, in which with a position at which a circumferential center of each pole teeth surface and a switching position between corresponding pole faces in the magnet section face each other as a turning reference position, the movable body circumferentially turns back and forth upon supply of an alternate current having a frequency that is substantially equal to a resonant frequency of the movable body to the coil section, the spring material is fixed to at least one of the movable body and the fixed body via a joint part, and the joint part includes an attachment portion to which a distal end side of an end portion of the spring material is fixedly attached, and a stress relaxation section disposed adjacent to the attachment portion, the stress relaxation section relaxing stress generated upon deformation of the spring material, at an end portion of the spring material.

An electric beauty device of the present invention includes the actuator described above.

Advantageous Effects of Invention

The present invention enables a high power to be stably provided with a simple configuration.

DESCRIPTION OF EMBODIMENT

An embodiment of the present invention will be described in detail below with reference to the accompanying drawings.

Embodiment 1

Figure 1:
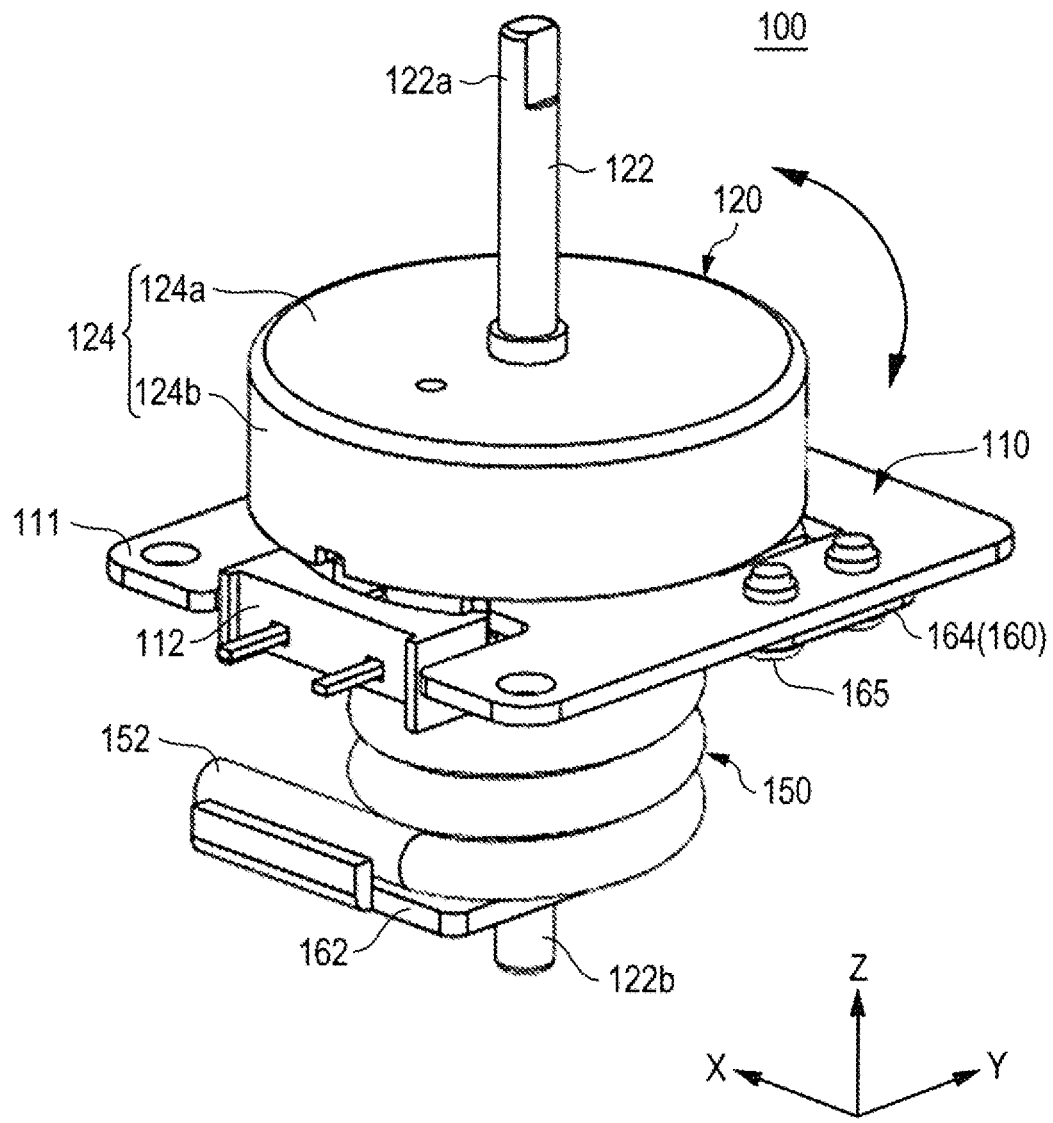
FIG. 1 is a perspective view illustrating an actuator according to Embodiment 1 of the present invention.
Figure 2:
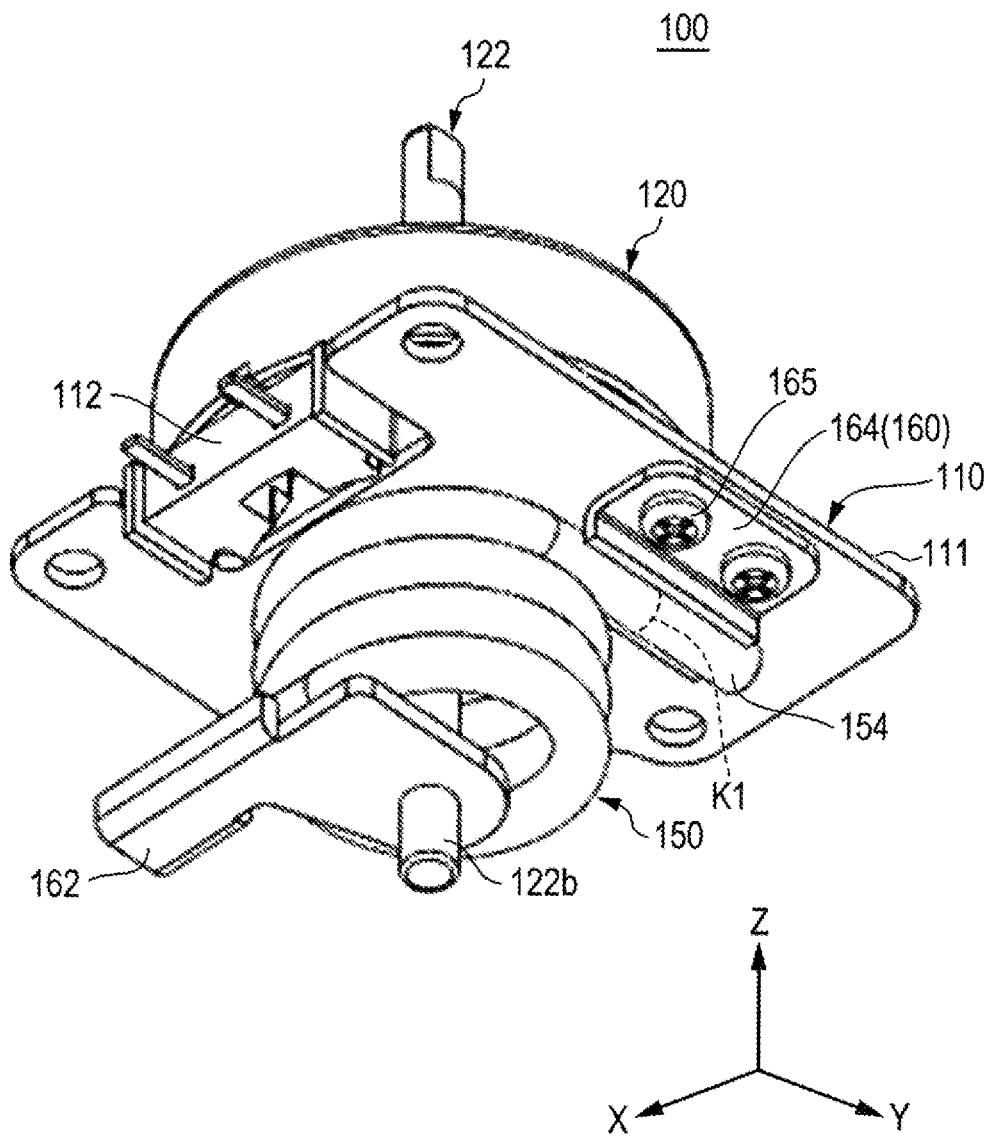
FIG. 2 is a perspective view illustrating a bottom surface of the actuator.
Figure 3:
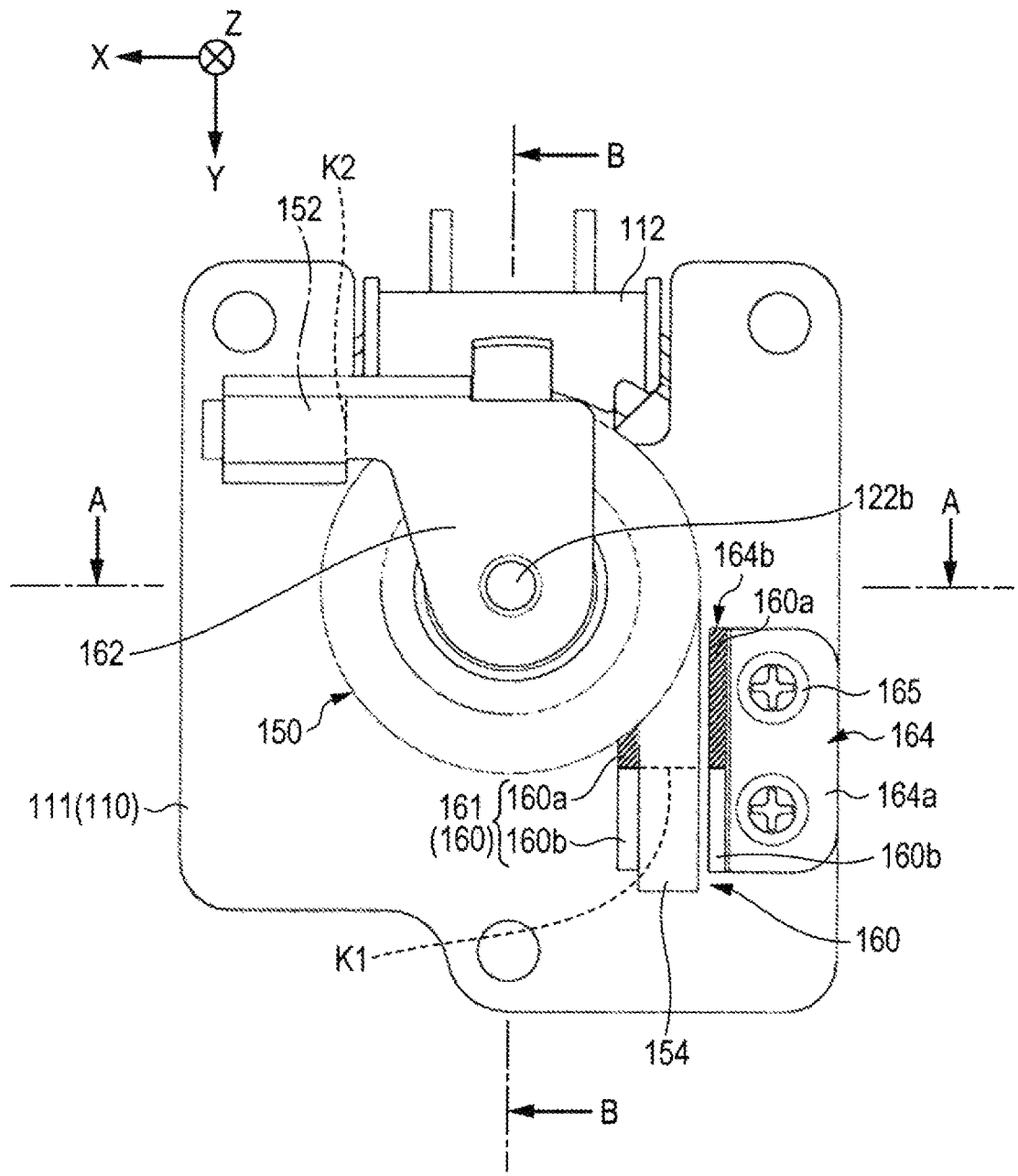
FIG. 3 is a bottom view of the actuator.
Figure 4:
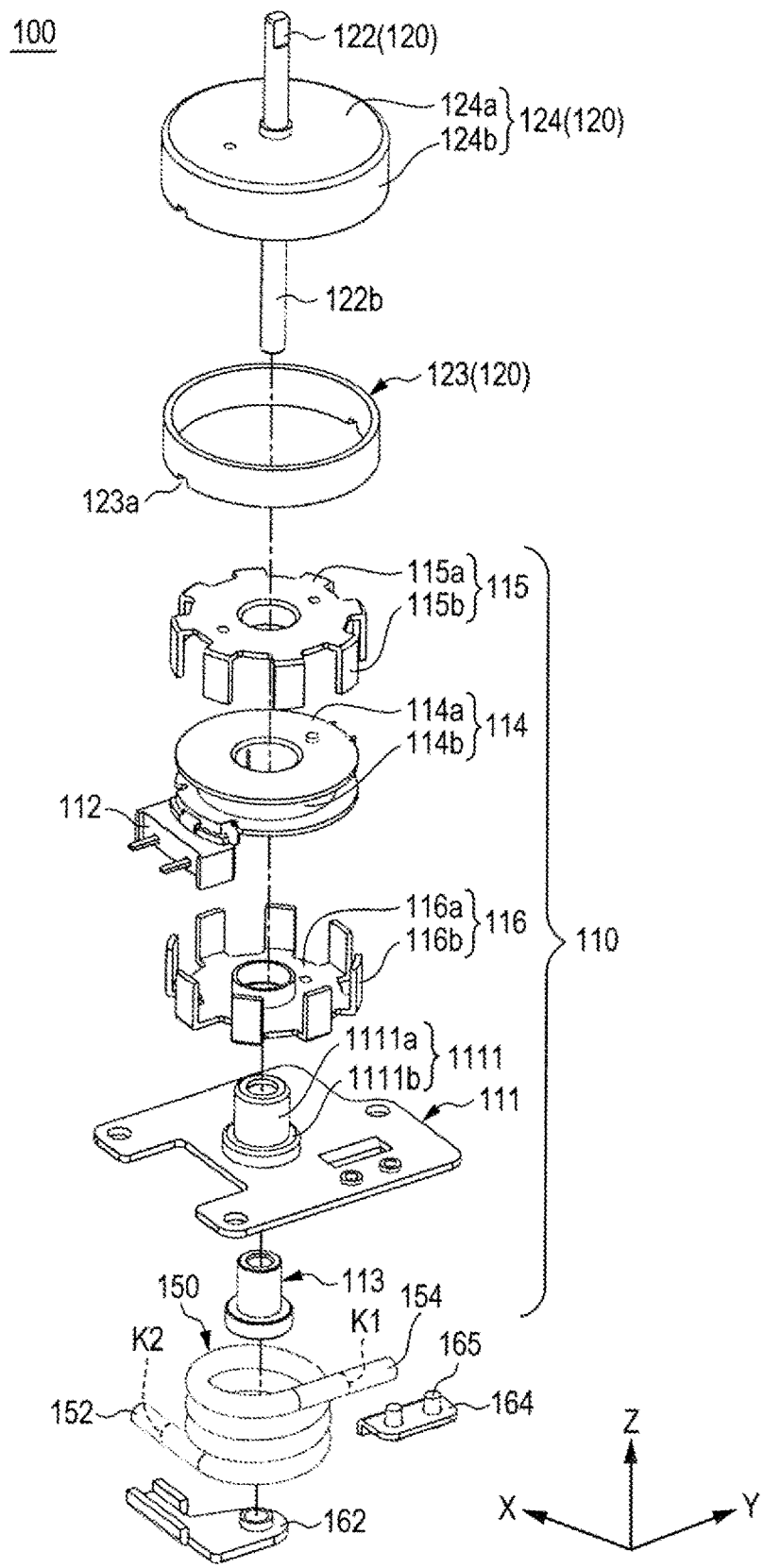
FIG. 4 is an exploded perspective view of a major part of the actuator.
Figure 5:
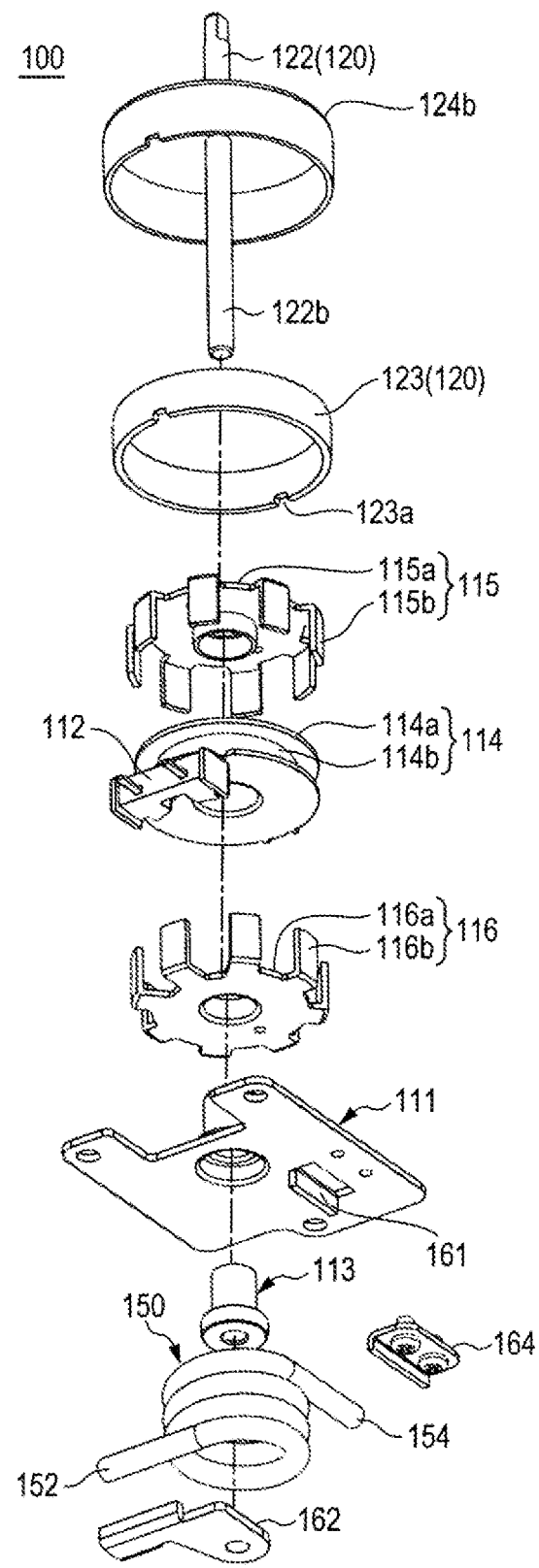
FIG. 5 is an exploded perspective view of the major part of the actuator illustrated in FIG. 3 as viewed from below.
Figure 6:
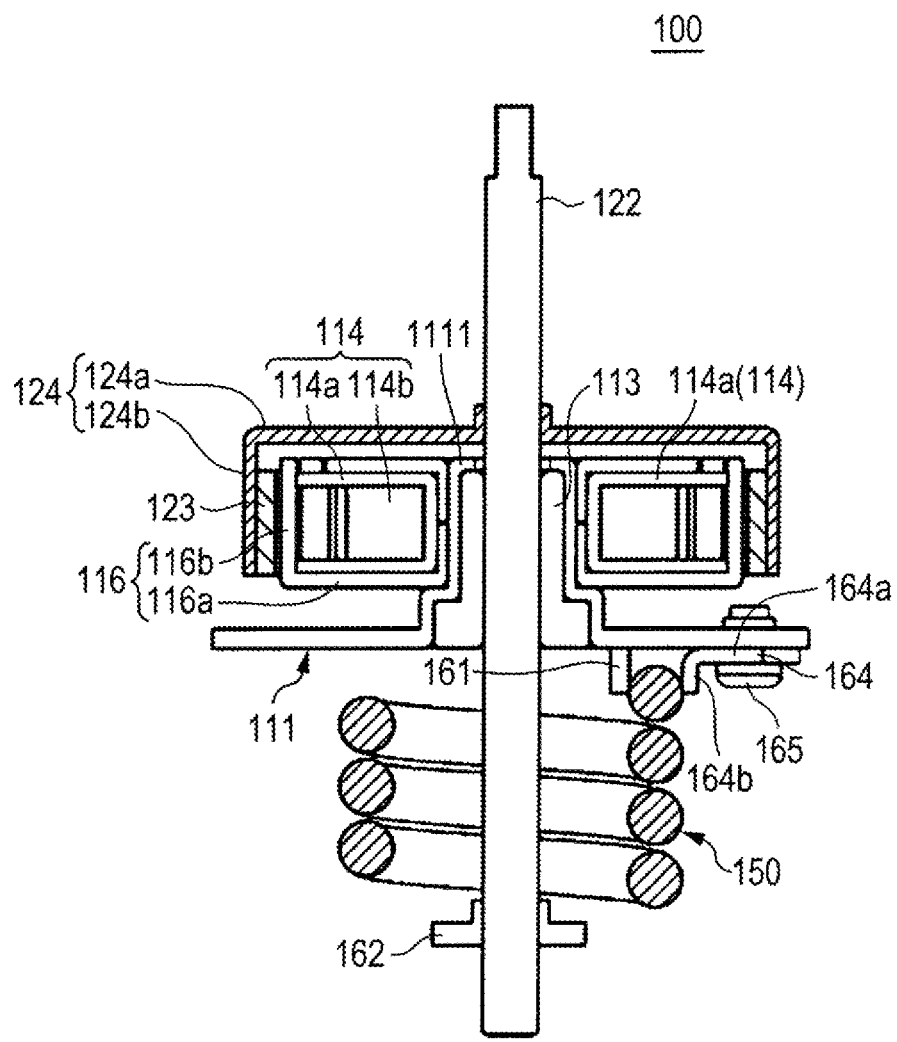
FIG. 6 is a cross-sectional view along the line indicated by arrows A-A in FIG. 3.
Figure 7:
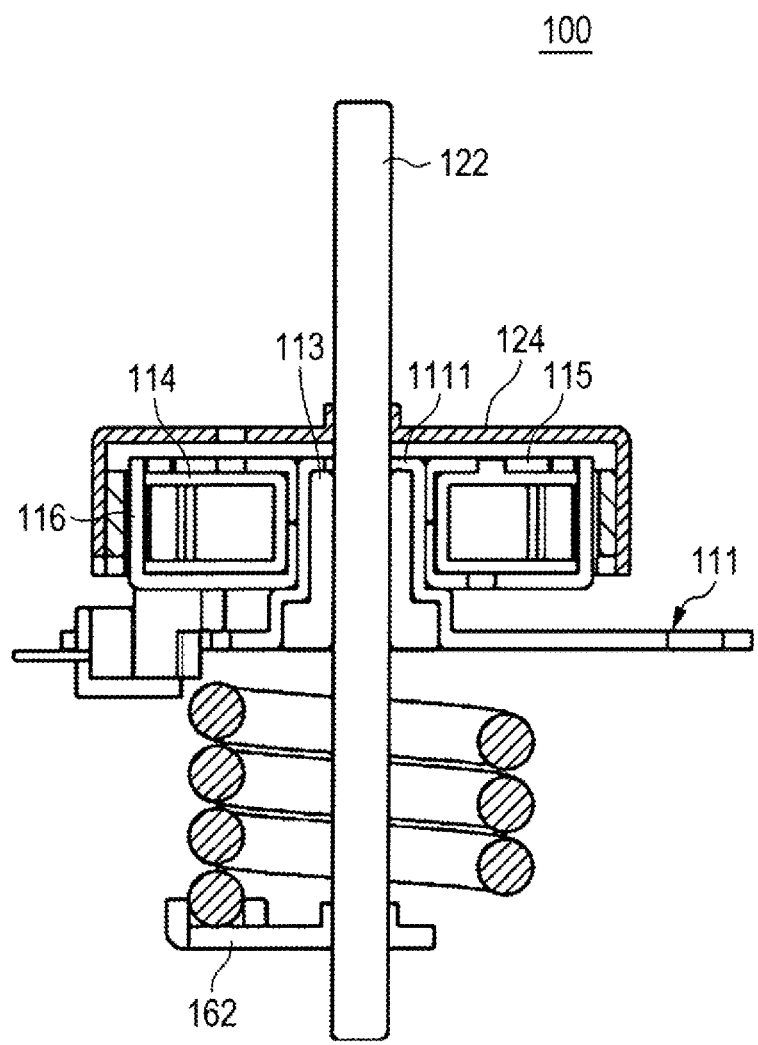
FIG. 7 is a cross-sectional view along the line indicated arrows B-B in FIG. 3.
Figure 17:
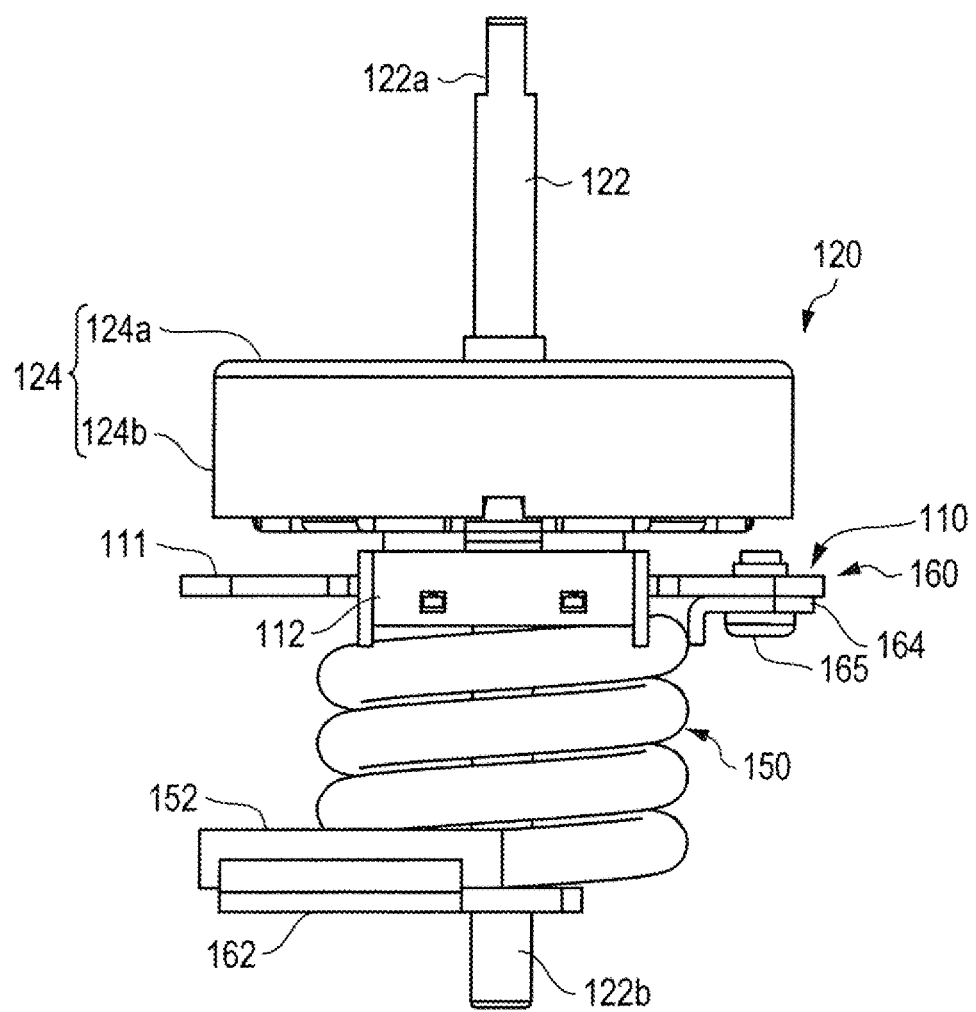
FIG. 17 is a front view of an actuator according to Embodiment 1 of the present invention.
Figure 18:
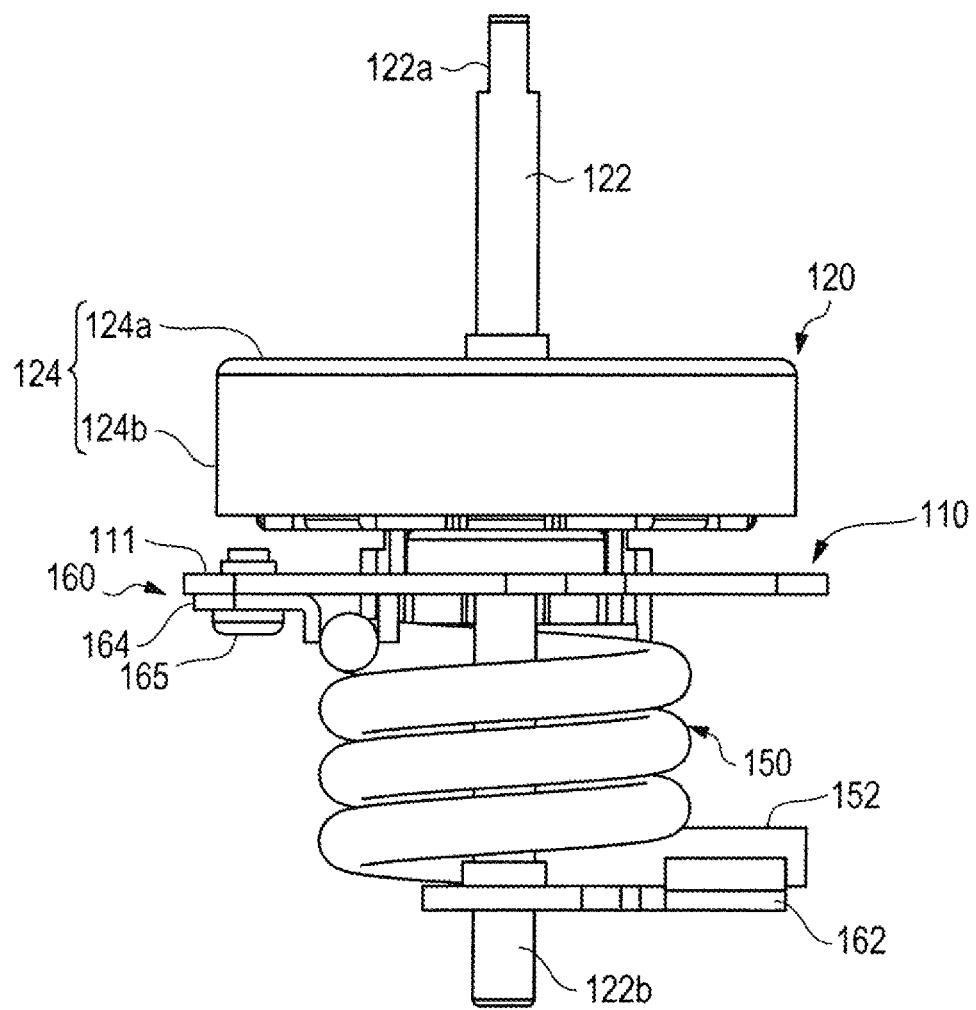
FIG. 18 is a back view of an actuator according to Embodiment 1 of the present invention.
Figure 19:
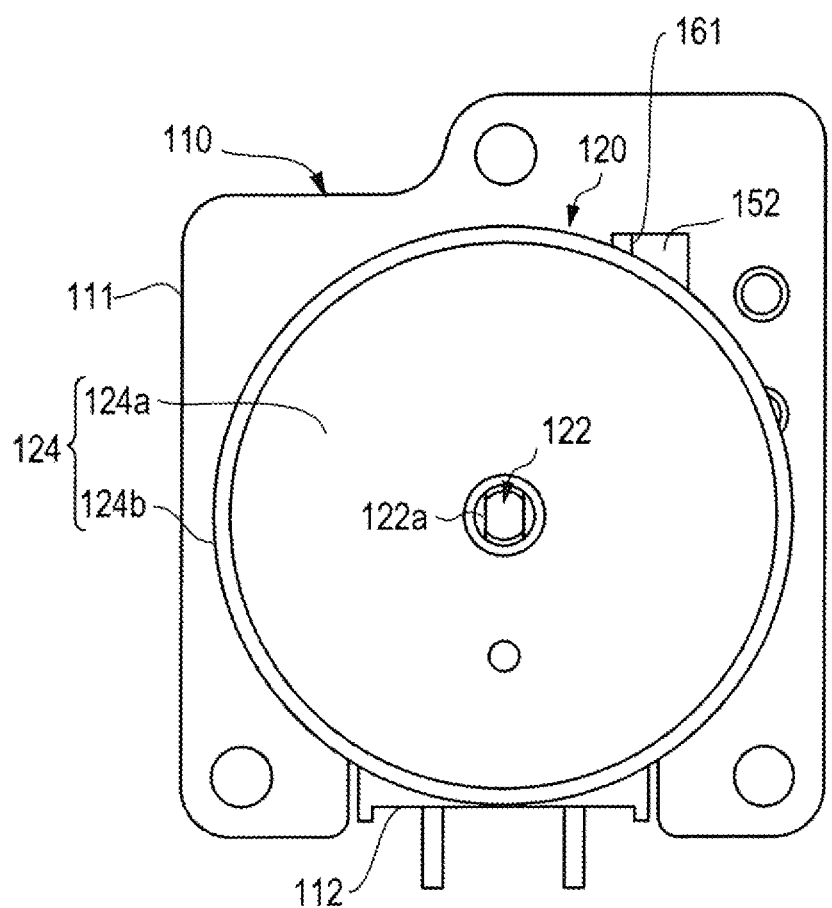
FIG. 19 is a plan view of an actuator according to Embodiment 1 of the present invention.
Figure 20:
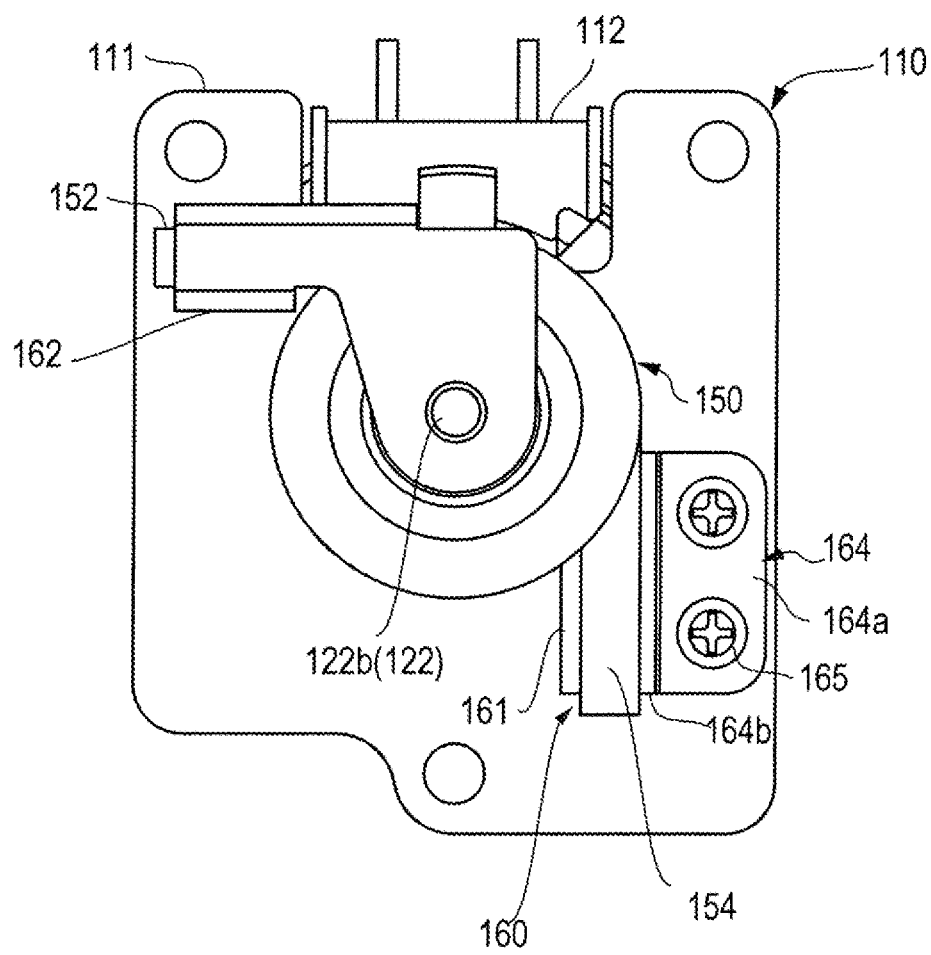
FIG. 20 is a bottom view of an actuator according to Embodiment 1 of the present invention.
Figure 21:
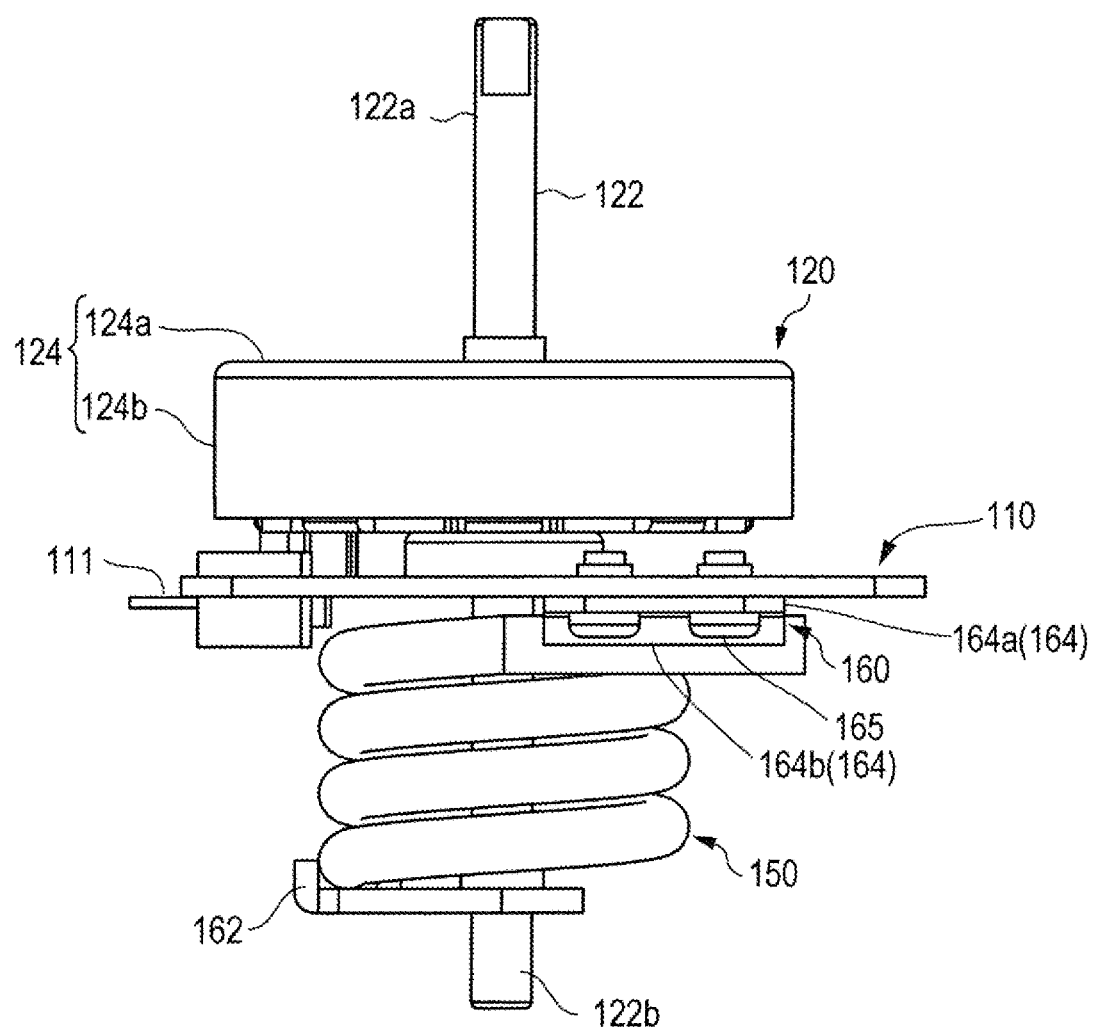
FIG. 21 is a right side view of an actuator according to Embodiment 1 of the present invention.
Figure 22:
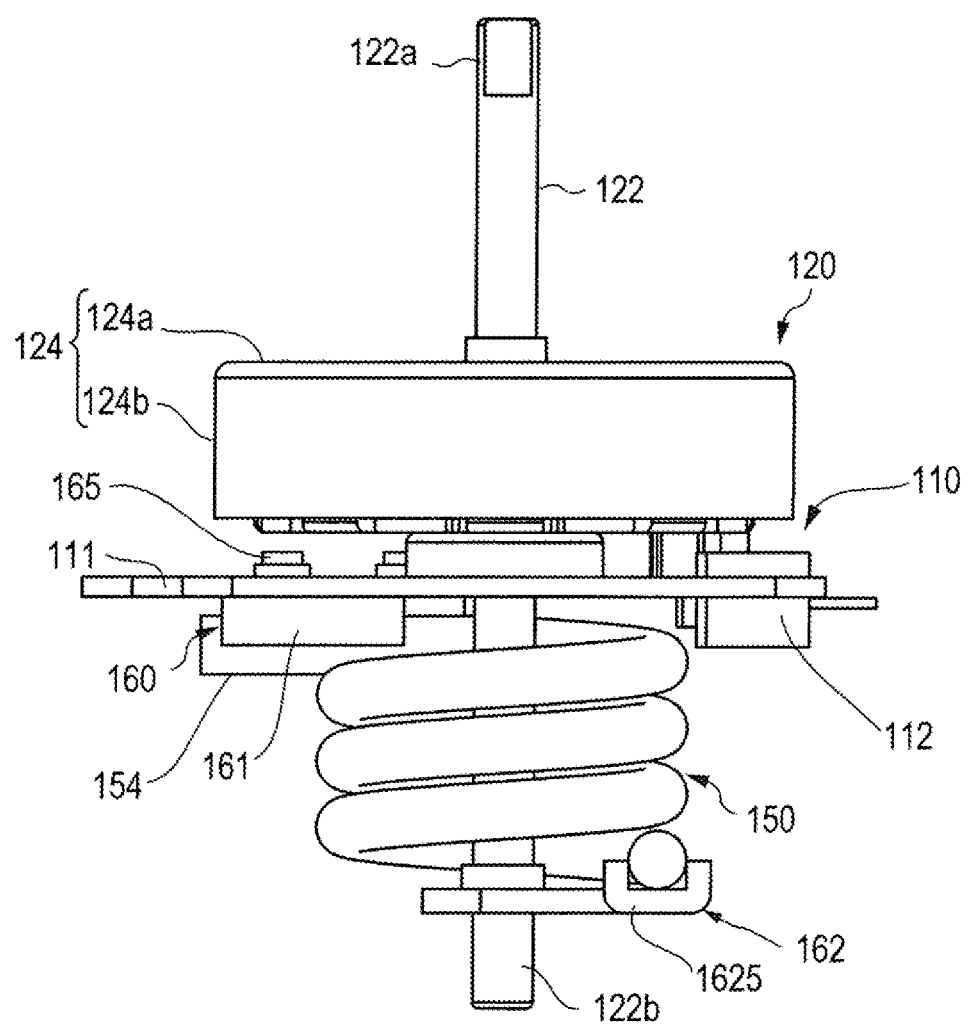
FIG. 22 is a left side view of an actuator according to Embodiment 1 of the present invention.

FIG. 1 is a perspective view illustrating an actuator according to Embodiment 1 of the present invention; FIG. 2 is a perspective view illustrating a bottom surface of the actuator; and FIG. 3 is a bottom view of the actuator. Also, FIG. 4 is an exploded perspective view of a major part of the actuator, and FIG. 5 is an exploded perspective view of the major part of the actuator illustrated in FIG. 3 as viewed from below. FIG. 6 is a cross-sectional view along the line indicated by arrows A-A in FIG. 3; and FIG. 7 is a cross-sectional view along the line indicated by arrows B-B in FIG. 3. Also, FIG. 17 is a front view of an actuator according to Embodiment 1 of the present invention; FIG. 18 is a back view of the actuator; FIG. 19 is a plan view of the actuator; FIG. 20 is a bottom view of the actuator; FIG. 21 is a right side view of the actuator; and FIG. 22 is a left side view of the actuator.

Actuator 100, which is illustrated in FIGS. 1, 2 and 17 to 22, includes fixed body 110, movable body 120, spring material 150 (see FIG. 2) that causes fixed body 110 to movably support movable body 120, and alternate current supply input section (hereinafter referred to as "alternate current input section") 112.

In actuator 100, which is illustrated in FIGS. 1 and 2, movable body 120 (see FIG. 2) is capable of moving relative to fixed body 110 upon power supply from a non-illustrated alternate current supply section to coil section 114 via alternate current input section 112. Rotation shaft 122 of movable body 120 turns in forward and reverse directions (directions indicated by the arrows in FIG. 1) within a predetermined angle range and thereby outputs rotational reciprocating vibration to the outside.

As illustrated in FIGS. 4 to 7, fixed body 110 includes base plate 111, bearing 113, annular coil section 114, and comb teeth-like upper and lower yokes (core) 115, 116 including pole teeth (pole teeth surfaces) 115b, 116b arranged along an outer circumference of coil section 114, respectively.

In fixed body 110, tubular bearing cover portion 1111 to which bearing 113 is inserted from the lower side is formed in base plate 111. Bearing cover portion 1111 is shaped so as to vertically project from the lower side to the upper side of base plate 111, via drawing. Consequently, bearing 113, which is inserted from the lower side of base plate 111, is fitted in bearing cover portion 1111 and disposed so as to be provided upright vertically from a body part of base plate 111.

Rotation shaft 122 of movable body 120 is inserted in bearing 113, and bearing 113 rotatably supports rotation shaft 122.

Coil section 114 surrounded by upper and lower yokes 115, 116 is disposed around an outer circumference of bearing 113.

Coil section 114 is formed by circumferentially winding coil 114b around bobbin 114a. Bobbin 114a is used jointly with coil 114b for generating a drive source for actuator 100. Bobbin 114a is coaxial to rotation shaft 122 and coil 114b. A coil winding of coil 114b is connected to alternate current input section 112, and is connected to an external terminal connected to the alternate current supply section via alternate current input section 112. An alternate current (alternate-current voltage) is supplied from alternate current supply section to coil 114b via alternate current input section 112.

Upper and lower yokes 115, 116 are magnetic bodies, and include pole teeth 115b, 116b in a comb teeth-like form, pole teeth 115b, 116b being provided vertically from outer circumferential edges of the annular body plate portions 115a, 116a, respectively. Upper and lower yokes 115, 116 are disposed so as to axially sandwich coil section 114, upper and lower yokes 115, 116 being not in contact with each other. Body plate portions 115a, 116a of upper and lower yokes 115, 116 are disposed so as to face upper and lower surfaces of coil section 114 that are axially spaced from each other, respectively, and pole teeth 115b, 116b of upper and lower yokes 115, 116 are circumferentially alternately disposed so as to surround an outer circumferential surface of coil section 114. More specifically, upper yoke 115 is fitted on coil section 114 from the upper side of coil section 114, body plate portion 115a faces an upper surface of coil section 114, and pole teeth 115b are positioned in a comb-like form (at predetermined intervals) along the outer circumferential surface of coil section 114. Lower yoke 116 is fitted on coil section 114 from the lower side of coil section 114, body plate portion 116a faces a lower surface of coil section 114, and pole teeth 116b are evenly disposed among pole teeth 115b positioned along the outer circumferential surface of coil section 114.

The number of poles in pole teeth 115b, 116b of upper and lower yokes 115, 116 is equal to the number of magnetic poles in magnet 123 (which will be described later) of movable body 120.

With this configuration, upon supply of alternate-current electric power to coil 114b, upper yoke 115 and lower yoke 116 are excited and thereby have polarities that are different from each other, and respective pole teeth 115b, 116b of upper and lower yokes 115, 116 are also excited and thereby have polarities that are different from each other. Upon supply of an alternate current having a frequency that is substantially equal to a resonant frequency of movable body 120 from alternate current input section 112, coil 114b excite pole teeth 115b, 116b so as to exhibit alternately different polarities. In other words, on the outer circumferential surface of coil section 114, different magnetic pole faces are alternately arranged along the outer circumferential surface.

The polarities of pole teeth 115b, 116b are alternately changed as a result of supply of forward and reverse currents to coil section 114.

Magnet 123 of movable body 120 is disposed so as to face pole teeth 115b, 116b arranged along the outer circumferential surface of coil section 114, with a predetermined space therebetween.

Here, although pole teeth 115b, 116b have sixteen poles as with the number of poles in the relevant magnet (which will be described later), the number of poles may be any number as long as the number is no less than two. The number of poles is not limited to this example as long as a plurality of poles are provided. Here, sixteen pole teeth 115b, 116b are circumferentially alternately arranged so as to face a circumferential surface of magnet 123, and the number of poles is equal to the number of N-poles (N-pole face) and S-poles (S-pole face) in magnet 123.

Movable body 120 includes rotation shaft 122, magnet 123, and rotor cover section 124 that fixes rotation shaft 122 and magnet 123.

Magnet 123 is magnetized in such a manner that cylindrical multiple poles (here, sixteen poles) are circumferentially alternately provided. For magnet 123, e.g., a neodymium bonded magnet, a ferrite bonded magnet, a neodymium sintered magnet or a ferrite rubber magnet is employed.

More specifically, magnet 123 is magnetized so as to have magnetic pole faces having alternately different polarities, such as an N-pole, an S-pole, an N-pole, an S-pole, an N-pole, . . . , circumferentially along a circumferential surface (here, an inner circumferential surface) facing pole teeth 115*b*, 116*b*. A length, in a circumferential direction (here, a circumferential direction orthogonal to the rotation shaft), of each of the magnetized surfaces such as an N-pole, an S-pole, . . . is longer than a length in the circumferential direction of each of pole teeth 115*b*, 116*b*. Here, magnet 123 has an integral configuration having a cylindrical shape.

Magnet 123 is fixed to rotation shaft 122 via rotor cover section 124 formed of a magnetic body.

Pole teeth 115*b*, 116*b* are positioned relative to the magnetized surfaces of magnet 123 in such a manner that a circumferential center position of each pole tooth 115*b* or 116 is radially aligned with a switching position between magnetized surfaces N, S (an N-pole face and an S-pole face) (division position between magnetized surfaces S, N) in magnet 123 around an axis of the rotation shaft. Here, it is assumed that a position in which each center position and the corresponding switching position are aligned with each other on a same radial straight line around rotation shaft 122 is a turning motion reference position (turning reference position) for movable body 120. In other words, movable body 120 is turnably held by fixed body 110 with a position in which the circumferential center position of each tooth 115*b*, 116*b* and the corresponding switching position (division line) between magnetic pole faces in magnet 123 face each other as a turning reference position.

Here, since actuator 100 has sixteen poles, a range of turning of movable body 120 is a range of 11.25 degrees in each of the forward and reverse directions relative to fixed body 110 around each turning reference position. In order to determine a position in which each center position and the corresponding switching position are aligned with each other on a same radial straight line around rotation shaft 122, recess portions 123*a* are formed in magnet 123. Consequently, each position at which a magnetic pole in magnet 123 switches can easily be set at a center position of pole tooth 115*b* or 116*b* to assemble actuator 100. Here, magnet 123 can be selected according to the power of actuator 100.

Rotor cover section 124, which functions as a magnet fixing section, has a cup-like shape formed via drawing, and is formed by hanging tubular portion 124*b* from an outer circumference of disk-like fixing section body 124*a*. Magnet 123 is fixed to an inner circumferential surface of tubular portion 124*b*.

Rotation shaft 122 orthogonally inserted through a center portion of fixing section body 124*a* of rotor cover section 124 is fixed to the center portion in such a manner that distal end portion 122*a* projects to the outside. Here, rotor cover section 124 and rotation shaft 122 are fixed to each other via welding. Since rotor cover section 124 is fixed to rotation shaft 122 via welding, rotor cover section 124 can be fixed to rotation shaft 122 after assembly of rotation shaft 122 to actuator 100. Also, rotor cover section 124 may be fixed to rotation shaft 122 via bonding using an epoxy-based material.

Rotation shaft 122 is fixed so as to be positioned on an axis of rotor cover section 124.

Rotation shaft 122 is inserted through a shaft hole of bearing cover portion 1111 formed in fixed body 110 (base plate 111). Another end portion of rotation shaft 122 is fixed to spring material 150 on the back side of base plate 111 and also to base plate 111 via shaft fixing component (joint part) 162.

Spring material 150 elastically supports movable body 120 against fixed body 110. Here, as spring material 150, a torsion coil spring is employed. Rotation shaft 122 is turnably inserted inside the torsion coil spring. Here, it is preferable that rotation shaft 122 be positioned on an axis of the torsion coil spring and the axis of rotation shaft 122 correspond to a center axis of the torsion.

One end portion 152 of the torsion coil spring, which is spring material 150, is fixed to proximal end portion 122*b* of rotation shaft 122 via shaft fixing component 162, and other end portion 154 of the torsion coil spring is fixed to base plate 111 via base fixing component (joint part) 164. Here, shaft fixing component 162 is formed so as to include a recess in which one end portion 152 of the spring material is fitted (see recess portion 1625 illustrated in FIG. 22), and after one end portion 152 is disposed inside the recess and thereby positioned relative to rotation shaft 122, a position of shaft fixing component 162 relative to rotation shaft 122 can be determined. In other words, shaft fixing component 162 enables spring material 150 to be fixedly attached to rotation shaft 122 via, e.g., welding, according to the position of one end portion 152, with no excess load imposed.

Opposite end portions 152, 154 of spring material 150, which is a torsion coil spring, have reference points K1, K2 for a spring constant (K, which will be described later), respectively, in spring material 150. Spring material 150 is fixed to at least either of movable body 120 and fixed body 110 to which the opposite end portions are fixed, respectively, on the distal end side relative to relevant reference point (position) K1, K2 for the spring constant.

Here, other end portion 154 of spring material 150 is fixed at a part on the distal end side of other end portion 154 relative to reference position K1, which is a reference point for the spring constant K, via base fixing component 164.

More specifically, base fixing component 164 is joined to base plate 111 via joint part 160 that restricts movement in X and Y directions, on the distal end side of other end portion 154 of spring material 150 on the lower surface of base plate 111.

Here, joint part 160 includes protruding rib 161 provided upright on base plate 111, base fixing component 164, and screw portions 165 that fix base fixing component 164 to base plate 111 at predetermined positions.

Base fixing component 164 includes body plate 164*a* fixed to base plate 111 via screw portions 165, and protruding rib 164*b* vertically provided upright on body plate 164*a*. Rib 164*b* of base fixing component 164 includes attachment portion 160*b* to which the part, on the distal end side relative to reference position K1 (part on the free end side), of other end portion 154 is fixed, and stress relaxation section 160*a* that upon deformation of spring material 150, abuts against spring material 150 on the one end portion 152 side of spring material 150 relative to reference position K1 and thereby relaxes stress generated at the fixed part of the other end portion 154.

Also, rib 161 includes attachment portion 160b to which the part, on the free end side relative to reference position K1, of other end portion 154 of spring material 150 is fixed, and stress relaxation section 160a that upon deformation of spring material 150, abuts against spring material 150 on the one end portion side of spring material 150 relative to reference position K1 and thereby relaxes stress generated at the fixed part of abutted other end portion 154.

Here, attachment portion 160b is fixed to other end portion 154 via welding. Also, attachment portion 160b may be fixed to other end portion 154 via bonding using an epoxy-based material.

Stress relaxation section 160a abuts against spring material 150, in particular, the torsion coil spring upon deformation of spring material 150 and thereby relaxes stress imposed on other end portion 154.

As described above, at the time of deformation of spring material 150, spring material 150 abuts against stress relaxation section 160a on the coil part side of spring material 150 relative to attachment portion 160b, enabling dispersion of stress localizing on other end portion 154 in spring material 150. Consequently, stress generated in spring material 150 as a result of rotational reciprocating motion, that is, vibration of movable body 120 is prevented from localizing on spring material 150 (more specifically, other end portion 154 joined to base plate 111).

Also, base fixing component 164 is fixed by fastening body plate 164a to base plate 111 via screw portions 165. Openings each having an outer diameter that is larger than that of screw portions 165 are formed in either body plate 164a or base plate 111, and a position of fixation of base fixing component 164 can be adjusted by adjustment of positions of screw portions 165 inserted through the openings and fastened. In other words, screw portions 165 function as a fixation position adjustment section.

Consequently, when spring material 150 is fixed to fixed body 110 and movable body 120, if, e.g., a torsion coil spring is employed as spring material 150, even if there is dimensional variation in manufacturing according to tolerance, base fixing component 164 is moved for adjustment, whereby a dimensional error due to the variation (tolerance of around +/−0.5 mm) can easily be cancelled. For example, even if a torsion coil spring, which is spring material 150, has a tolerance and other end portion 154 has a dimensional error, it is possible that base fixing component 164 is disposed so as to cancel the error and other end portion 154 is fixed to base plate 111 via base fixing component 164. Consequently, an error causing a decrease in precision can be cancelled, and spring material 150 can be attached to fixed body 110 (base plate 111) in such a favorable manner that spring material 150 has a necessary spring constant, enabling easy ensuring of precision in assembling of the actuator and thus enhancement in assemblability.

Spring material (torsion coil spring) 150 is positioned so that switching positions between adjacent magnetized surfaces having different polarities in the inner circumferential surface of magnet 123 of movable body 120 are located at the respective circumferential centers of pole teeth 115b, 116b of fixed body 110.

Also, spring material (torsion coil spring) 150 can have a spring constant that is constant in a direction of turning of magnet 123, and movable body 120 is movable circumferentially. Spring material 150 enables resonant frequency adjustment for actuator 100.

In actuator 100 having the above configuration, upper and lower yokes 115, 116, that is, pole teeth 115b, 116b are magnetized by alternate-current waves input to coil 114b, to efficiently generate a magnetic attraction force and a repulsion force against magnet 123 of movable body 120. Consequently, magnet 123 of movable body 120 moves in both circumferential directions relative to the centers of pole teeth 115b, 116b, which are turning reference positions, and consequently, magnet 123 itself turns back and forth around rotation shaft 122.

In actuator 100 according to the present embodiment, where J is an inertia moment of movable body 120 and $K_{sp}$ is a spring constant in the torsion direction, movable body 120 vibrates relative to fixed body 110 at resonant frequency $f_r$[Hz] calculated according to equation 1 below.

(Equation 1)

$$f_r = \frac{1}{2\pi}\sqrt{\frac{K_{sp}}{J}} \quad [1]$$

$f_r$: Resonant frequency [Hz]

In actuator 100 according to the present embodiment, an alternate current having a frequency that is substantially equal to resonant frequency $f_r$ of movable body 120 is supplied from alternate current input section 112 to coil 114b to excite pole teeth 115b, 116b via coil 114b. Consequently, movable body 120 can efficiently be driven.

Movable body 120 in actuator 100 is supported in a spring-mass system structure in which movable body 120 is supported by fixed body 110 via spring material 150. Therefore, upon supply of an alternate current having a frequency that is equal to resonant frequency $f_r$ of movable body 120 to coil 114b, movable body 120 is driven in a resonant condition. Rotational reciprocating vibration generated at this time is transmitted to rotation shaft 122 of movable body 120.

Actuator 100 is driven based on the motion equation indicated in equation 2 below and the circuit equation indicated in equation 3 below.

(Equation 2)

$$J\frac{d^2\theta(t)}{dt^2} = K_t i(t) - K_{sp}\theta(t) - D\frac{d\theta(t)}{dt} - T_{Load} \quad [2]$$

J: Inertia moment [Kgm$^2$]
$\theta(t)$: Angle [rad]
$K_t$: Torque constant [Nm/A]
i(t): Current [A]
$K_{sp}$: Spring constant [Nm/rad]
D: Attenuation coefficient [Nm/(rad/s)]
$T_{Load}$: Load torque [Nm]

(Equation 3)

$$e(t) = Ri(t) + L\frac{di(t)}{dt} + K_e\frac{d\theta(t)}{dt} \quad [3]$$

e(t): Voltage [V]
R: Resistance [Ω]
L: Inductance [H]
$K_e$: Back EMF constant [V/(rad/s)]

In other words, inertia moment J[Kgm$^2$], rotational angle $\theta(t)$[rad], torque constant $K_t$[Nm/A], current i(t)[A], spring constant $K_{sp}$[Nm/rad], attenuation coefficient D[Nm/

(rad/s)], load torque $T_{Load}$ [Nm], etc., in actuator 100 can arbitrarily be changed within a range in which equation 2 is satisfied. Also, voltage e(t)[V], resistance inductance L[H] and back EMF constant $K_e$[V/(rad/s] can arbitrarily be changed within a range in which equation 3 is satisfied. As described above, when actuator 100 is driven at resonant frequency $f_r$ determined by inertia moment J of movable body 120 and spring constant K of spring material (elastic body) 150, a large power can efficiently be obtained.

Next, specific operation of actuator 100 will be described.

Upon a current flowing to coil 114*b* of coil section 114 (it is assumed that the current flows in the forward direction), pole teeth 115*b* of upper yoke 115 are excited and thereby each have a polarity (for example, an N-pole), and pole teeth 116*b* of lower yoke 116 is excited and thereby each have a polarity that is different from that of pole teeth 116*b* (for example, an S-pole). Division lines between magnetic pole faces (S, N) in magnet 123 of movable body 120 are disposed at center positions in the circumferential direction (turning direction) of respective pole teeth 115*b*, 116*b*, that is, the respective turning reference positions, so as to face the respective pole teeth 115*b*, 116*b*.

Therefore, in the entire inner circumferential surface of magnet 123, N-pole faces are attracted by pole teeth 115*b*, which are S-pole faces, and S-pole faces of magnet 123 are attracted by pole teeth 116*b*, which are N-pole teeth, and surfaces having a same polarity repel each other. Consequently, largest torque is generated in the entire inner circumference of magnet 123, and magnet 123 thus turn in one circumferential direction (for example, counterclockwise). Then, each pole face in magnet 123 tries to stop at a position at which the pole face faces pole tooth 115*b* or 116*b* excited so as to have a magnetic pole that is opposite to that of the pole face. When magnet 123 tries to be positioned at this position, torque in a direction opposite to the previous movement direction also acts on magnet 123 because of repulsion between magnet 123 and pole teeth adjacent to the pole faces of magnet 123, the pole teeth having respective magnetic polarities that are the same as those of pole faces.

Also, a biasing force toward the turning reference position side acts on magnet 123 (movable body 120) because of a resilient force of spring material 150. In this state, a current having a direction opposite to the forward current (reverse current) flows into coil section 114. Then, the respective polarities of pole teeth 115*b*, 116*b* are changed: each pole teeth 115 that is an N-pole is excited so as to be an S-pole; and each pole teeth 116*b* that is an S-pole is excited so as to be an N-pole. Consequently, magnet 123 moves in the direction that is opposite to that of the previous movement as a result of generation of torque in the reverse direction by magnetic attraction forces and magnetic repulsion forces generated between the respective pole faces and pole teeth 115*b*, 116*b*. Also, this torque acts also via the resilient force of spring material 150.

In other words, as a result of a current flowing in coil 114*b* in the forward direction and the reverse direction alternately, movable body 120 repeats movement in one circumferential direction, movement toward the turning reference position side via the biasing force of spring material 150, movement in the other circumferential direction beyond the turning reference positions, movement toward the turning reference position side via the biasing force of spring material 150 and movement in the one circumferential direction beyond the turning reference positions, relative to fixed body 110, sequentially. As described above, movable body 120 of actuator 100 turns back and forth, that is, vibrates around rotation shaft 122 and the reference positions and thereby outputs a reciprocating vibration force to the outside via rotation shaft 122.

Figure 8:
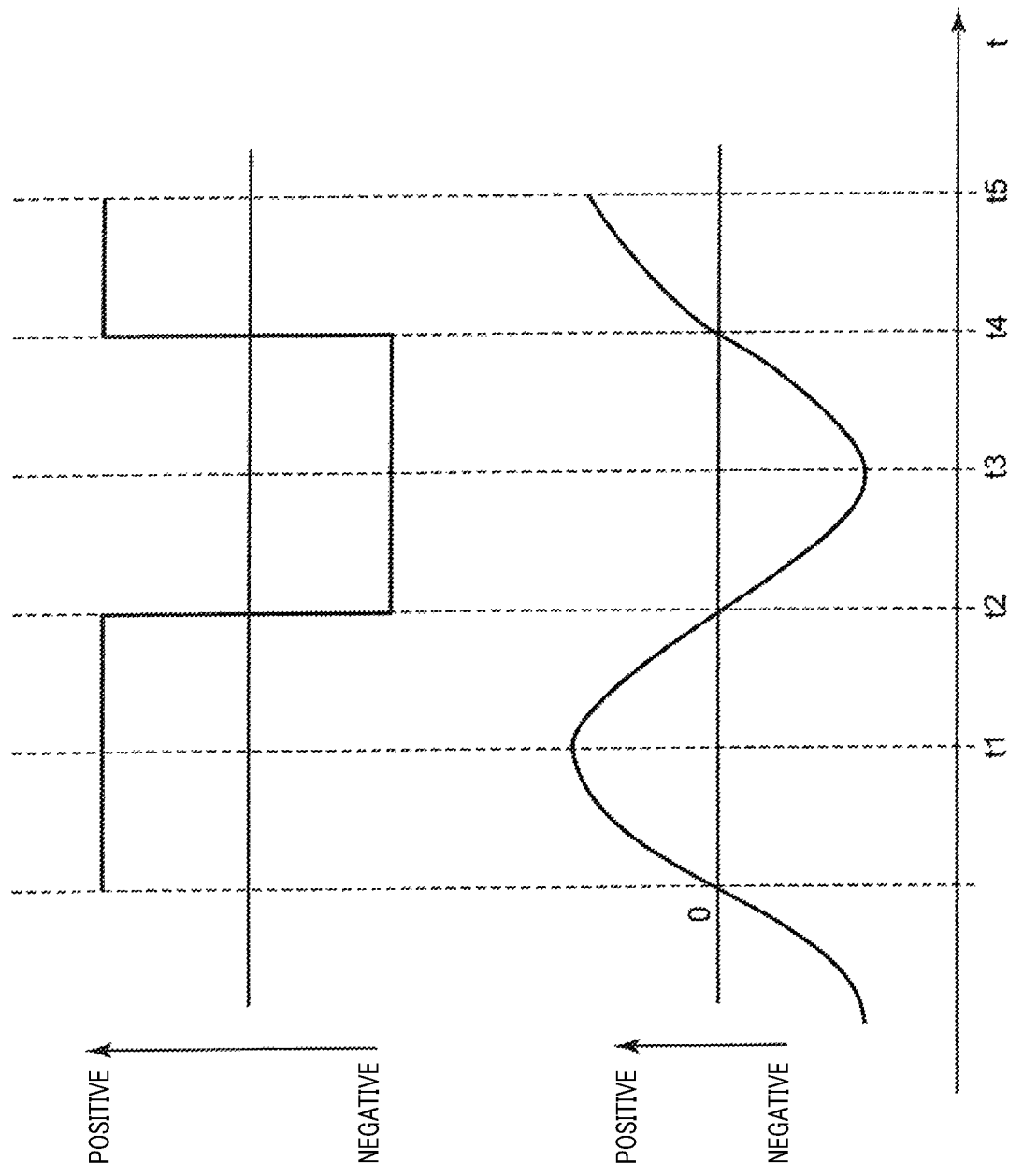
FIGS. 8A and 8B are diagrams each illustrating a cycle of an alternate current supplied to a coil via an alternate current input section in the actuator.

FIGS. 8A and 8B are diagrams each indicating a cycle of an alternate current supplied to coil 114*b* of fixed body 110 via alternate current input section 112 in the actuator according to the present embodiment.

The alternate current flowing in the coil may have pulse waves of frequency $f_0$ as illustrated in FIG. 8A or may have sinusoidal waves of frequency $f_0$ as illustrated in FIG. 8B.

A forward current is supplied at time t1 indicated in FIGS. 8A and 8B, and a reverse current is supplied at time t3 indicated in FIGS. 8A and 8B. Also, as indicated in time t4 in FIGS. 8A and 8B, when the direction of the current is changed and magnet 123 thereby turns back to the turning reference positions, a forward current is supplied at time t5. This is an operation for one cycle, and such operation is repeated, whereby movable body 120 repeats movements and thus rotationally vibrate back and forth.

When actuator 100 is assembled, bearing 113 can be inserted to base plate 111 and spring material 150 can be joined to base plate 111 and rotation shaft 122 via shaft fixing component 162 or base fixing component 164. In other words, when actuator 100 is assembled, before coil section 114 surrounded by upper and lower yokes 115, 116 is externally fitted on bearing cover portion 111*l* and rotor cover section 124 is fixedly attached to rotation shaft 122 via welding or bonding, spring material 150, which has a manufacturing tolerance, can be provided between rotation shaft 122 of movable body 120 and base plate 111 of fixed body 110 at an early stage regardless of the tolerance. Subsequently, coil section 114 and magnet 123 are assembled thereto.

Furthermore, when actuator 100 is assembled, rotor cover section 124 can be fixed to rotation shaft 122 via welding or bonding lastly. Consequently, if movable body 120 is displaced in a rotation direction, actuator 100 can be assembled while the displacement is adjusted when rotor cover section 124 is fixed to rotation shaft 122. As described above, when actuator 100 is assembled, components to be fixed to each other is joined to each other via, e.g., welding or bonding, enabling elimination of a displacement depending on a degree of variation of spring material 150. Consequently, deterioration in assembling precision of assembled actuator 100 due to variation of spring material 150 can be prevented.

As described above, according to the present embodiment, an actuator having a simple magnetic circuit configuration that enables provision of a high power while ensuring assembling precision, moderating component precision requirements and reducing material costs can be provided.

Also, magnet 123 is disposed annularly so as to face pole teeth 115*b*, 116*b* disposed in fixed body 110 so as to have circumferentially alternately different polarities, and the entire inner circumference of magnet 123, the inner circumference facing teeth 115*b*, 116*b*, can be used as a drive source, enabling provision of an actuator with high conversion efficiency. Also, magnetic attraction forces and magnetic repulsion forces are generated on the entire circumference of magnet 123, enabling generation of largest torque.

In actuator 100, movable body 120 is brought into rotational reciprocating motion, that is, rotational reciprocating vibration, and the rotational reciprocating vibration is output to the outside via rotation shaft 122. A toothbrush part or a facewash brush part that is provided at a head part so as to be orthogonal to the axis direction and includes a bristle bundle portion or a blade of, e.g., an electric razor, an electric shaver or an electric hair clipper is connected to distal end portion 122a of rotation shaft 122, enabling the brush or the blade to vibrate back and forth.

As described above, actuator 100 is driven by a resonant phenomenon that satisfies equations 2 and 3 and uses the resonant frequency indicated in equation 1. Consequently, in actuator 100, electric power consumed in a steady state has only a loss due to load torque and a loss due to, e.g., friction, and thus, actuator 100 can be driven with low electric power consumption, that is, movable body 120 can be caused to rotationally vibrate back and forth with low electric power consumption.

Also, movable body 120 is movably supported by fixed body 110 via spring material (torsion coil spring) 150, and spring material 150 is fixed to fixed body 110 (more specifically, base plate 111) via rib 161 and base fixing component 164 included in joint part 160. Joint part 160 includes attachment portion 160b to which the free end side of other end portion 154 of spring material 150 is fixedly attached, and stress relaxation section 160a disposed adjacent to attachment portion 160b, stress relaxation section 160a relaxing stress generated upon deformation of spring material 150. Consequently, when actuator 100 is driven and movable body 120 is brought into rotational reciprocating motion, even if stress is generated on other end portion 154 of spring material 150, the stress is disposed by the stress relaxation section, which prevents the stress from being locally concentrated in spring material 150 and thus increases the life of the spring. Consequently, actuator 100 can be driven for a long period of time, ensuring high reliability.

Also, spring material 150 is fixed to movable body 120 (more specifically, rotation shaft 122) and fixed body 110 (more specifically, base plate 111) via shaft fixing component 162 and attachment portions 160b of base fixing component 164 via welding. Also, spring material 150 may be fixed to movable body 120 (more specifically, rotation shaft 122) and fixed body 110 via shaft fixing component 162 and attachment portions 160b of base fixing component 164 via bonding using an epoxy-based material. The employment of welding or bonding enables enhancement in mutual joint strength and thus enables enhancement in reliability of actuator 100. Also, the employment of welding or bonding enhances rigidity of joining between each of movable body 120 and fixed body 110 and spring material 150, suppresses material attenuation, and enables enhancement in sharpness of resonance and an increase in amplitude of movable body 120.

In particular, attachment portions 160b fixedly attached to other end portion 154 are formed so as to include a recess, by ribs formed by flexing base fixing component 164 and base plate 111, which are each formed of a metal sheet, respectively. Other end portion 154 (more specifically, the part, on the free end side relative to reference position K1, of other end portion 154) is disposed in this recess part and fixedly attached to the recess part via welding. As a result of members each formed by flexing a metal sheet being welded to other end portion 154, other end portion 154 can reliably be joined to the members in a large area and reliability can further be enhanced. Also, in assembling, displacement in height direction (Z direction) can be cancelled. Here, other end portion 154 and attachment portions 160b may be fixed to each other via bonding using an epoxy-based material.

Also, other end portion 154 of spring material 150 is fixed to fixed body 110 (base plate 111) by rib 161 provided in the base plate and base fixing component 164 that enables a change in position of attachment of other end portion 154 to fixed body 110 (base plate 111). Consequently, even if there is a margin of manufacturing error in dimension in torsion coil springs, which spring materials 150, a decrease in assemblability of actuator 100 is prevented by cancelling the error when a torsion coil spring is assembled to actuator 100.

Although in the present embodiment, a configuration in which stress relaxation section 160a and attachment portion 160b are continuously provided in each of rib 161 and rib 164b in joint part 160 that joins other end portion 154 of spring material 150 to fixed body 110 (base plate 111) is provided, the present invention is not limited to this configuration.

Figure 9:
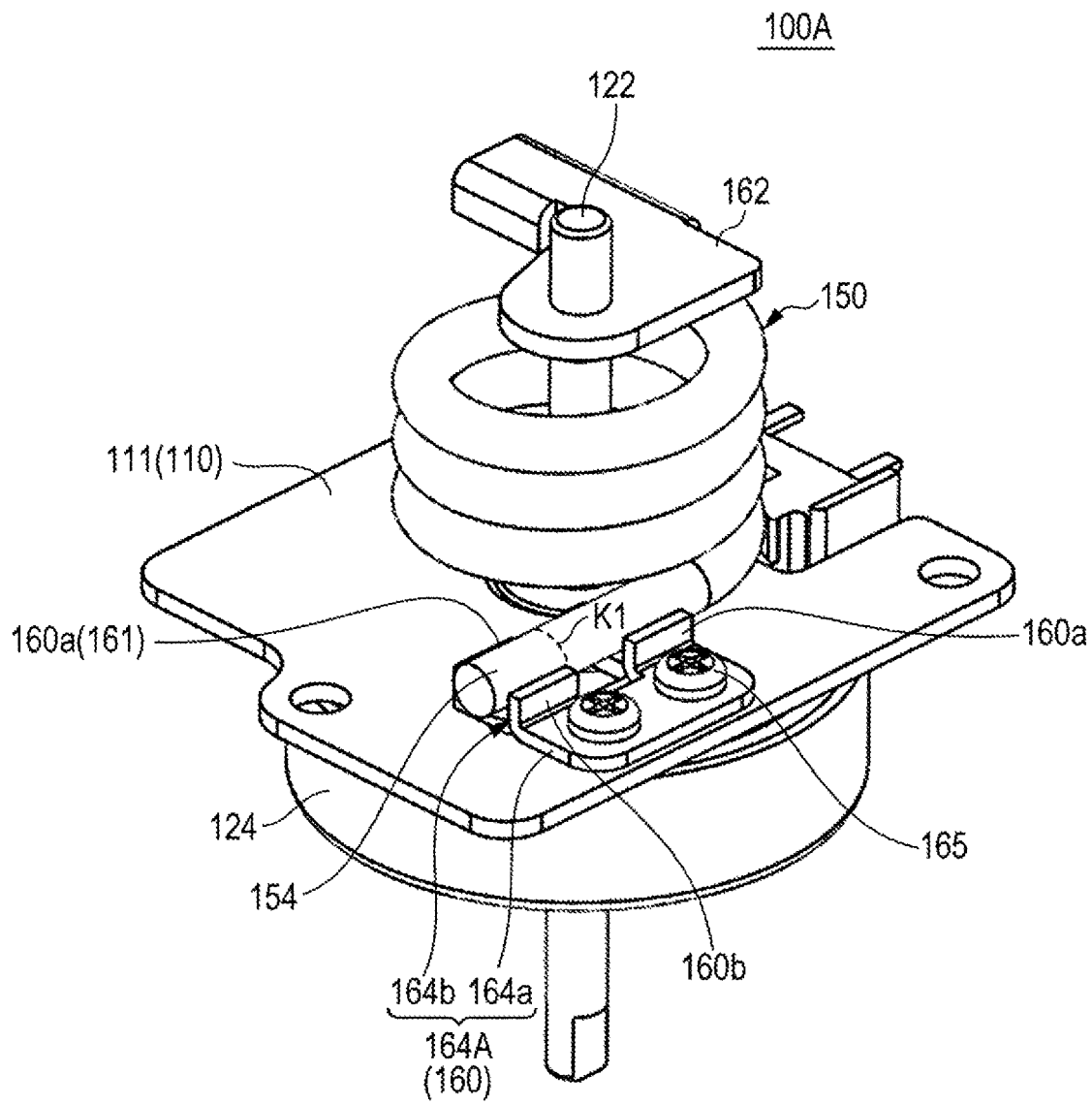
FIG. 9 is a perspective view illustrating a bottom surface of an alteration of the actuator according to Embodiment 1 of the present invention.
Figure 10:
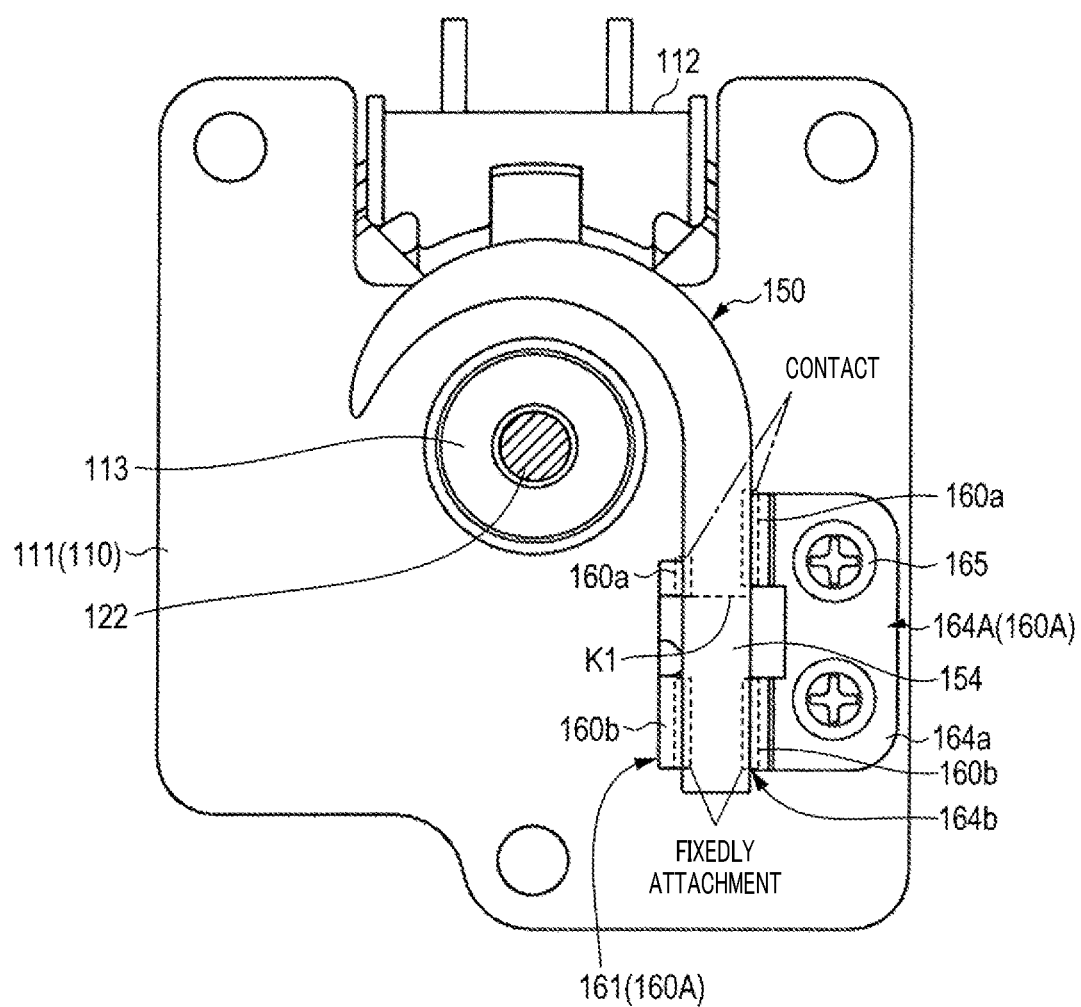
FIG. 10 is a bottom view illustrating a fixation part in the alteration of the actuator.

For example, as illustrated in FIGS. 9 and 10, stress relaxation section 160a and attachment portion 160b may be formed so as to be spaced from each other in each of rib 161 and rib 164b. FIG. 9 is a perspective view illustrating an alteration of the actuator according to Embodiment 1 of the present invention, and FIG. 10 is a bottom view illustrating a fixation part in the alternation of the actuator. In FIG. 10, for ease of description of base fixing component 164A, a coil part of spring material 150 is omitted.

Actuator 100A illustrated in FIGS. 9 and 10 are different from actuator 100 in configuration of joint part 160A and is similar to actuator 100 in rest of the configuration. Therefore, components that are the same as those of actuator 100 according to Embodiment 1 illustrated in FIGS. 1 to 7 are provided with reference numerals that are the same as those of actuator 100, and description thereof will be omitted.

In actuator 100A illustrated in FIGS. 9 and 10, joint part 160A to which other end portion 154 of spring material 150 that causes fixed body 110 to movably support movable body 120 includes stress relaxation sections 160a and attachment portions 160b spaced from each other.

In other words, stress relaxation sections 160a and attachment portions 160b in joint part 160A are formed by vertically flexing parts of base plate 111 and parts of base fixing component 164A (corresponding to rib 164b) individually. A part, on the free end side relative to reference position K1 for a spring constant of spring material 150, of spring material 150 is fixedly attached to attachment portion 160b via welding, and the part, on the coil part side relative to reference position K1, of spring material 150 is disposed in stress relaxation sections 160a forming a recess.

In other words, as illustrated in FIG. 10, when spring material 150 is deformed, that is, actuator 100A is driven, other end portion 154 of spring material 150 is in contact with stress relaxation sections 160a (indicated by dashed lines) and fixedly attached to attachment portions 160b (indicated by dashed lines). Consequently, operation and effects that are similar to those of joint part 160 in actuator 100 according to Embodiment 1 can be exerted. In addition, since in actuator 100A, stress relaxation sections 160a are spaced from attachment portions 160b, upon receipt of stress generated in other end portion 154 of spring material 150, stress relaxation sections 160a themselves deform and thereby easily absorb the stress.

Figure 11:
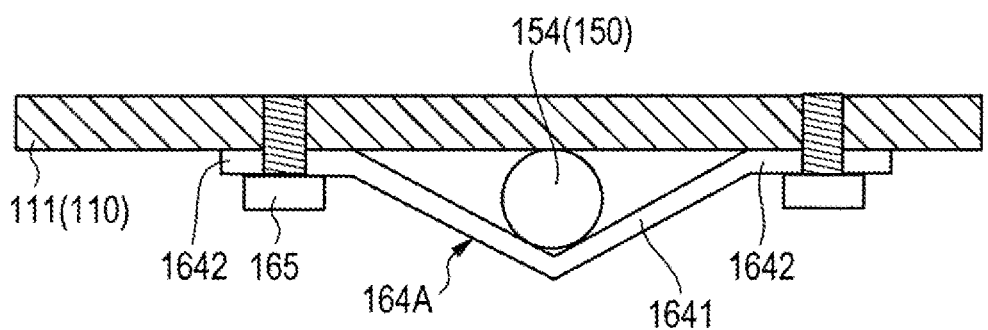
FIG. 11 is a diagram for describing an alteration of a base fixing component.

Also, base fixing component 164 may be configured as base fixing component (elastic material) 164A illustrated in FIG. 11 in which a recess part 1641 having a diameter that is smaller than an outer diameter of other end portion 154 is formed at a center portion of a metal sheet. Other end portion 154 may be fixedly attached to base fixing component 164A by disposing other end portion 154 in recess part 1641, screw-fastening opposite end portions 1642 of recess part 1641 to base plate 111 via screw portions 165 to cause recess part 1641 to deform and sandwich other end portion 154 between recess part 1641 and base plate 111.

Embodiment 2

Figure 12:
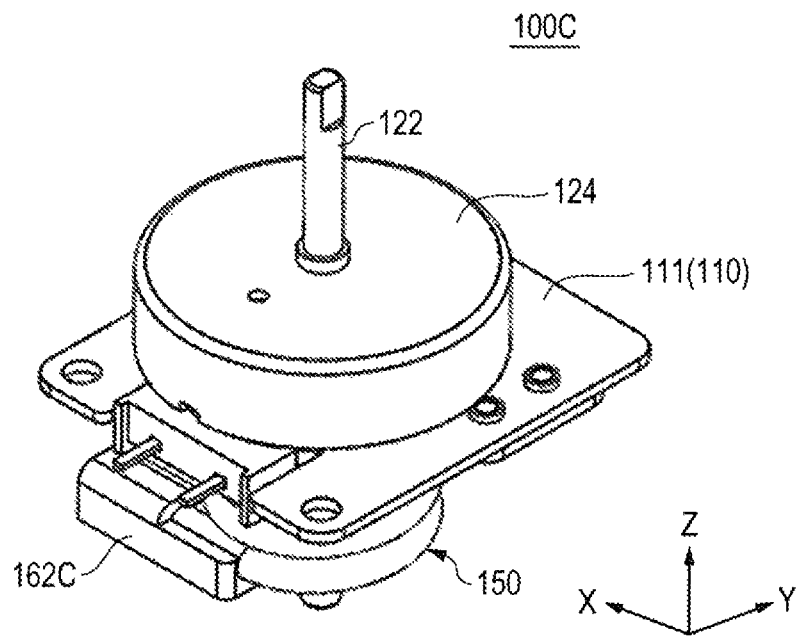
FIG. 12 is a perspective view illustrating an actuator according to Embodiment 2 of the present invention.
Figure 13:
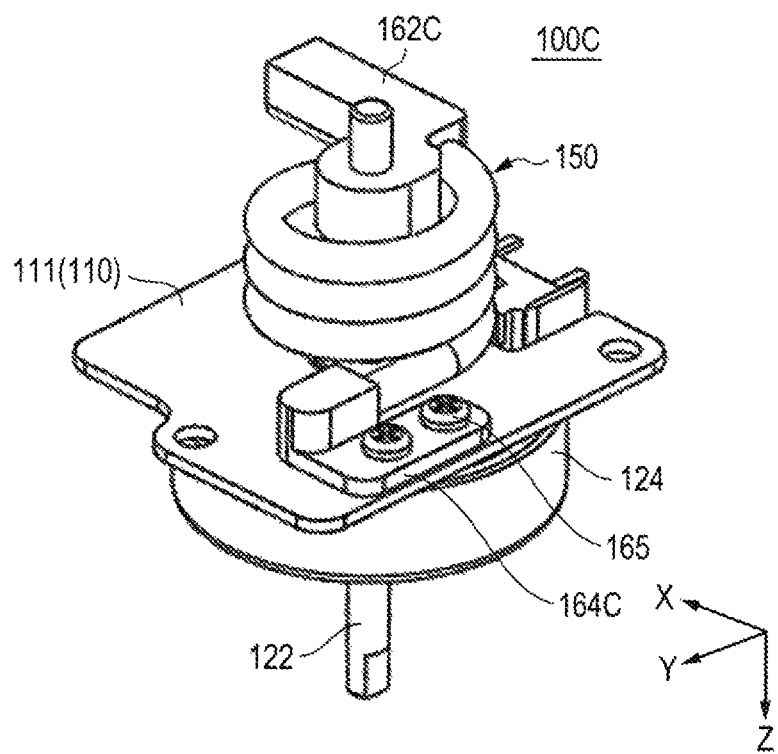
FIG. 13 is a perspective view illustrating a bottom surface of the actuator.
Figure 14:
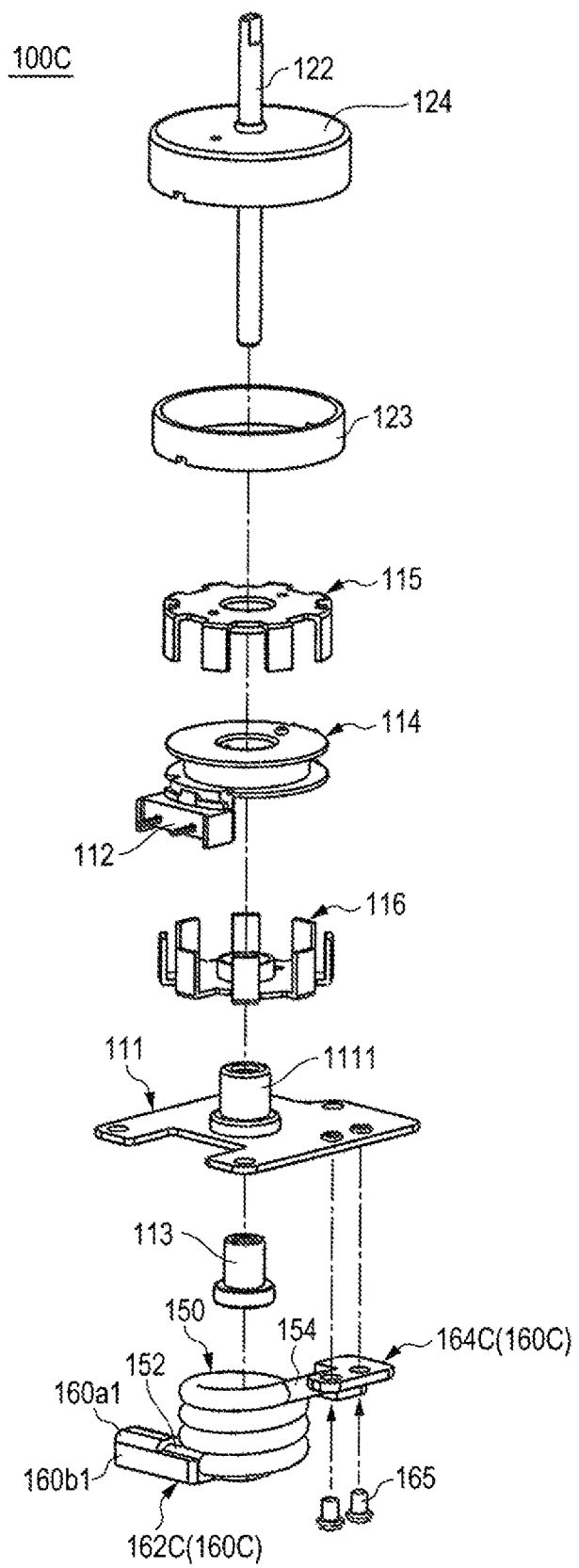
FIG. 14 is an exploded perspective view of a major part of the actuator.
Figure 15:
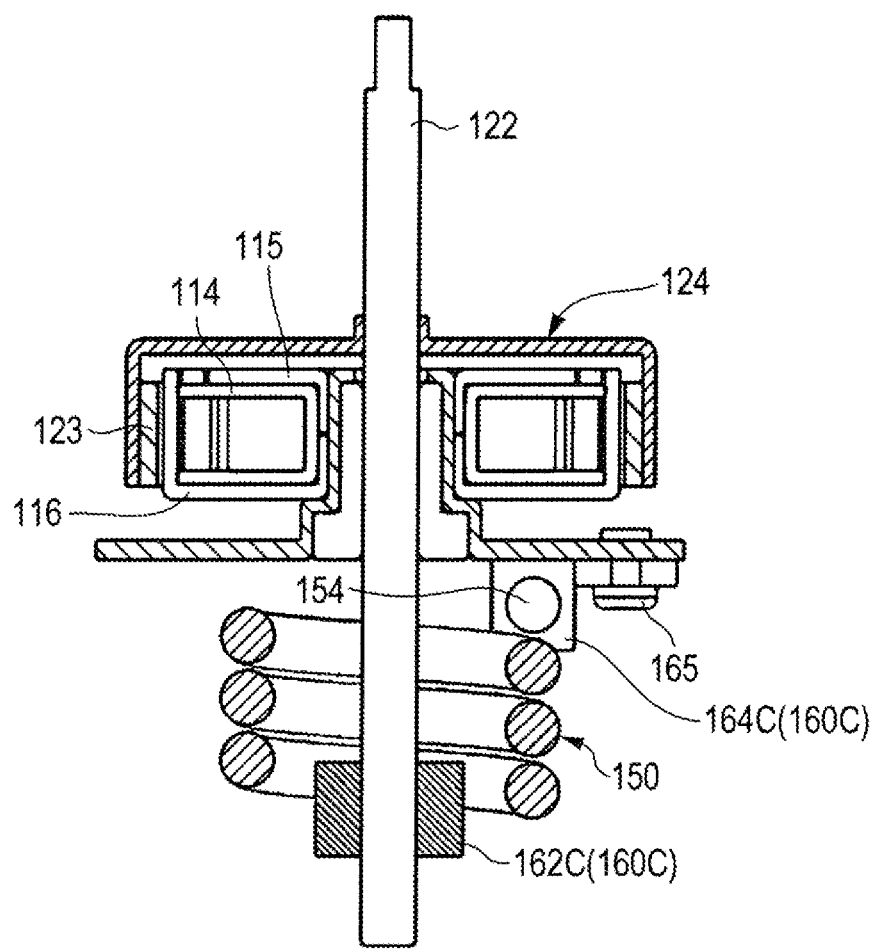
FIG. 15 is a cross-sectional view along a Y-axis in FIG. 12.
Figure 16:
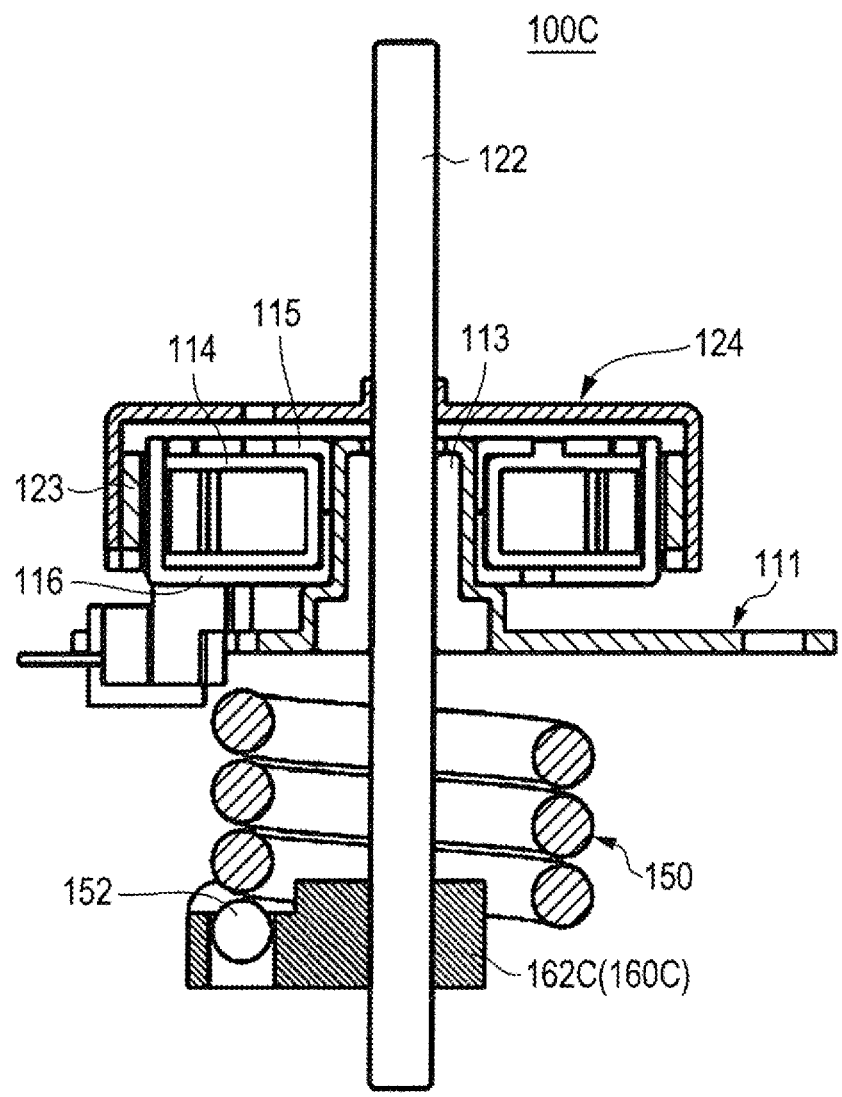
FIG. 16 is a cross-sectional view along an X-axis in FIG. 12.

FIG. 12 is a perspective view illustrating actuator 100C according to Embodiment 2 of the present invention; FIG. 13 is a perspective view of a bottom surface of actuator 100C, and FIG. 14 is an exploded perspective view of a major part of the actuator. FIG. 15 is a cross-sectional view along an X-axis extending through an axis of a rotation shaft in FIG. 12, and FIG. 16 is a cross-sectional view along a Y-axis extending through the axis of the rotation shaft in FIG. 12.

Actuator 100C, which is illustrated in FIGS. 12 to 16, is different in configuration from actuator 100 according to Embodiment 1 only in configurations of shaft fixing component 162C and base fixing component 164C, and the rest of the configuration is similar to that of actuator 100. Therefore, actuator 100C has a basic configuration that is similar to that of actuator 100 according to Embodiment 1 illustrated in FIG. 1, and components that are the same as those of actuator 100 are provided with reference numerals that are the same as those of actuator 100 and description thereof will be omitted.

Actuator 100C, which is illustrated in FIGS. 12 to 16, includes fixed body 110C and movable body 120C, which are configured so as to be similar to fixed body 110 and movable body 120 of actuator 100 according to Embodiment 1, respectively, and joint parts 160C are joined to fixed body 110C and movable body 120C so as to movably support spring material 150, respectively. Actuator 100C has an outer appearance that is similar to that of actuator 100.

Actuator 100C according to the present embodiment includes shaft fixing component 162C and base fixing component 164C integrated with respective opposite ends of spring material 150, as joint parts 160C that join spring material 150 to fixed body 110C and movable body 120C.

Shaft fixing component 162C is a component that fixes one end portion 152 of spring material 150 to movable body 120C, and base fixing component 164C is a component that fixes other end portion 154 of spring material 150 to fixed body 110C.

In the present embodiment, shaft fixing component 162C and base fixing component 164C are molded so as to be integrated with respective opposite end portions 152, 154 of spring material 150 via outsert molding in which a resin is incorporated in each of parts corresponding to opposite end portions 152, 154 of a torsion coil spring, which is to be spring material 150.

Consequently, when spring material 150, which is a torsion coil spring, is manufactured, even if spring material 150 has variation according to a tolerance, each of shaft fixing component 162C and base fixing component 164C can be molded integrally with spring material 150 at an accurate attachment position with a varying direction of spring material 150 unchanged.

In particular, shaft fixing component 162C, from among shaft fixing component 162C and base fixing component 164C, includes attachment portion 160b1 fixedly attached to the part, on the free end side relative to reference position K1 for a spring constant, of one end portion 152 of spring material 150, and stress relaxation section 160a1 disposed on the coil part side relative to reference position K1 for the spring constant. Attachment portion 160b1 and stress relaxation section 160a1 exert operation and effects that are similar to those of attachment portion 160b and stress relaxation section 160a.

Also, base fixing component 164C may be formed so as to be attached to base plate 111 with a position of base fixing component 164C adjusted relative to base plate 111. In such case, elongated holes or holes having a size that is larger than an outer diameter of screw portions 165 are formed in body plate 164a, and when base fixing component 164C is fixed via screw portions 165, base fixing component 164C is located at a predetermined position and fixed.

Therefore, spring material 150 molded by outsert molding, with shaft fixing component 162C and base fixing component 164C formed at respective opposite end portions 152, 154 thereof, can be assembled to actuator 100C to assemble actuator 100C in a favorable manner, and automated assembling using a manufacturing line can be achieved without manual position adjustment.

Various alterations can be made to the present invention described above as long as such alternations do not depart from the spirit of the present invention, and it should be understood that those resulting from such alterations fall within the scope of the present invention.

The entire disclosure of the description, the drawings and the abstract in Japanese Patent Application No. 2015-154522 filed on Aug. 4, 2015 is incorporated herein by reference.

INDUSTRIAL APPLICABILITY

An actuator and an electric beauty device according to the present invention have an effect of providing a high energy conversion coefficient and a high power with a simple configuration, and is effective for use in, e.g., an electric razor, an electric toothbrush or an electric face-wash brush.

REFERENCE SIGNS LIST 100, 100c actuator
110, 110c fixed body
111 base plate
112 alternate current input section
113 bearing
114 coil section
114a bobbin
114b coil
115 upper yoke
115b, 116b pole tooth
116 lower yoke
120, 120c movable body
122 rotation shaft
123 magnet
124 rotor cover section
150 spring material
152 one end portion
154 other end portion
160 joint part
160a, 160a1 stress relaxation section
160b, 160b1 attachment portion
162, 162C shaft fixing component
164, 164C base fixing component

The invention claimed is:
1. An actuator comprising:
a movable body including a rotation shaft and a cylindrical magnet section including N-pole faces and S-pole faces circumferentially alternating on a circumferential surface and around the rotation shaft;
a fixed body including a number of pole teeth surfaces arranged circumferentially so as to face the circumferential surface of the magnet section, the number of pole teeth surfaces being equal to a number of the N-pole faces and the S-pole faces, a coil that upon supply of a current, excites the pole teeth surfaces so that the pole teeth surfaces have circumferentially alternating different polarities, and a base plate; and a spring material connected to the movable body and the fixed body, the spring material causing the fixed body to movably hold the movable body, wherein:

with a position at which a circumferential center of each pole teeth surface and a switching position between corresponding pole faces in the magnet section face each other as a turning reference position, the movable body circumferentially turns back and forth upon supply of an alternate current having a frequency that is substantially equal to a resonant frequency of the movable body to the coil section, the spring material is a torsion coil spring with one end fixed to a proximal end portion of the rotation shaft and the other end fixed to the base plate of the fixed body via a joint part, and the joint part includes:
 an attachment portion to which a distal end side of the other end portion of the spring material is fixedly attached,
 a stress relaxation section disposed adjacent to the attachment portion, the stress relaxation section relaxing stress generated upon deformation of the spring material at an end portion of the spring material, in contact with the spring material in part,
 a fixation position adjustment section capable of adjusting a position of fixation of the spring material, and
 a fixing component fixed to the base plate of the fixed body by the fixation position adjustment section, and including the attachment portion and the stress relaxation section, wherein:

the attachment portion and the stress relaxation section comprise:
 a first protruding rib provided upright on the base plate of the fixed body; and
 a second protruding rib vertically provided upright on a body plate of the fixing component and arranged to sandwich the spring material with the first protruding rib, and
 the fixation position adjustment section is a screw portion, and the screw portion fixes the body plate to the base plate, the stress relaxation section composed by both the first and the second protruding ribs fix the spring material to the fixed body in a state where the other end portion of the spring material is in contact with the stress relaxation section.

2. The actuator according to claim 1, wherein the attachment portion is welded to the distal end side of the end portion of the spring material.

3. The actuator according to claim 1, wherein the spring material is bonded, together with the attachment portion and the stress relaxation section, to the fixed body.

4. The actuator according to claim 1, wherein the movable body includes:
 a cover member including a circumferential wall portion including an inner circumferential surface on which the cylindrical magnet section is disposed and a sheet-like lid portion disposed so as to cover the fixed body, the sheet-like lid portion occluding an opening of the circumferential wall portion; and
 the rotation shaft disposed orthogonally at a center of the lid portion of the cover member, the rotation shaft being fixed to the lid portion welded.

5. The actuator according to claim 1, wherein the magnet section includes a recess for positioning relative to the fixed body.

6. An electric beauty device comprising an actuator according to claim 1.

* * * * *